(12) United States Patent
Herth

(10) Patent No.: US 12,374,873 B1
(45) Date of Patent: Jul. 29, 2025

(54) STACKABLE ELECTRICAL WORK BOXES WITH EXTENDABLE PULL HANDLE TAB AND EASY INSERTION SURFACES

(71) Applicant: Greg Herth, Oakdale, NY (US)

(72) Inventor: Greg Herth, Oakdale, NY (US)

( * ) Notice: Subject to any disclaimer, the term of this patent is extended or adjusted under 35 U.S.C. 154(b) by 0 days.

(21) Appl. No.: 18/983,257

(22) Filed: Dec. 16, 2024

(51) Int. Cl.
*H02G 3/08* (2006.01)
*H02G 3/12* (2006.01)

(52) U.S. Cl.
CPC ............. *H02G 3/086* (2013.01); *H02G 3/126* (2013.01); *H02G 3/085* (2013.01)

(58) Field of Classification Search
CPC .......... H02G 3/08; H02G 3/081; H02G 3/083; H02G 3/086; H02G 3/10; H02G 3/12; H02G 3/121; H02G 3/123; H02G 3/126; H02G 3/085; H05K 5/00; H05K 5/02; H05K 5/0204; H05K 5/0217
USPC .. 174/480, 481, 50, 53, 57, 58, 61, 520, 63, 174/62; 220/3.2–3.9, 4.02; 248/906
See application file for complete search history.

(56) References Cited

U.S. PATENT DOCUMENTS

| | | | |
|---|---|---|---|
| 4,365,108 A | 12/1982 | Bright | |
| 5,088,246 A | 2/1992 | Brown | |
| 5,434,359 A * | 7/1995 | Schnell | H02G 3/18 220/3.6 |
| 5,600,093 A | 2/1997 | Herth et al. | |
| 5,841,068 A | 11/1998 | Umstead et al. | |
| 6,953,894 B2 | 10/2005 | Ungerman et al. | |
| 6,956,168 B2 | 10/2005 | Herth | |
| 6,956,169 B1 * | 10/2005 | Shotey | H02G 3/121 174/67 |
| 7,126,058 B2 | 10/2006 | Herth | |
| 7,307,212 B1 * | 12/2007 | Gretz | H02G 3/126 174/53 |
| 7,378,590 B1 | 5/2008 | Herth | |

(Continued)

FOREIGN PATENT DOCUMENTS

| | | |
|---|---|---|
| CA | 3013486 C | 6/2020 |
| CN | 210669404 U | 11/2019 |

(Continued)

OTHER PUBLICATIONS

Quazite B12243636A Tier-15 FRP Flared Wall Style Heavy Duty Nestable Non-Insulated Standard Open Bottom Underground Enclosure Box, 24 in L×36 in W×36 in H, Fiberglass Reinforced Polymer, Catalog, 2024, 1 page.

(Continued)

*Primary Examiner* — Angel R Estrada
(74) *Attorney, Agent, or Firm* — Alfred M. Walker

(57) ABSTRACT

Stackable electrical work boxes nest within each other, whereby the back of a work box, which protrudes outward, can nest inward into a front opening of another work box. Steps inside the work box are geometrically manipulated to fit in the recesses an adjacent work box, which has also been geometrically manipulated. The work box includes a slidable finger pull handle tab provided between parallel tracks on a side of the work box to slide outward at the user's convenience to hold the work box while inserting the work box into a wall panel hole. A corner of the box has a curved radius or mitered surface so that the box can pivot like a seesaw when being inserted into a cut-out in the wall panel.

21 Claims, 18 Drawing Sheets

(56) References Cited

U.S. PATENT DOCUMENTS

| | | |
|---|---|---|
| 7,518,059 B2 | 4/2009 | Herth |
| 7,554,032 B2 | 6/2009 | Herth |
| 7,595,448 B2 | 9/2009 | Herth |
| 8,242,360 B2 | 8/2012 | Berey, Sr. |
| 8,253,016 B1 | 8/2012 | Baldwin et al. |
| 8,253,017 B1 | 8/2012 | Cleghorn et al. |
| 8,288,650 B1 * | 10/2012 | Baldwin .............. H02G 3/081 174/50 |
| 8,344,249 B1 | 1/2013 | Baldwin et al. |
| 8,350,148 B1 * | 1/2013 | Shotey ................ H02G 3/123 439/535 |
| 8,445,779 B1 * | 5/2013 | Gretz ................. H02G 3/123 174/53 |
| 8,710,367 B2 | 4/2014 | Korez et al. |
| 8,899,431 B1 | 12/2014 | Shotey et al. |
| 8,975,518 B1 * | 3/2015 | Gretz ................. H02G 1/00 174/559 |
| 9,209,610 B1 * | 12/2015 | Dieterle ............... H02G 3/10 |
| 9,960,579 B2 | 5/2018 | Herth |
| 11,005,246 B2 | 5/2021 | Mevius et al. |
| 11,283,253 B1 | 3/2022 | Herth |
| 2012/0186871 A1 | 7/2012 | Roberts |

FOREIGN PATENT DOCUMENTS

| | | |
|---|---|---|
| CN | 113340372 B | 1/2023 |
| GB | 2411525 A | 8/2005 |
| WO | 2022212142 A1 | 10/2022 |

OTHER PUBLICATIONS

Amazon, EZ Electrical Single Gang, Old Work, Cut in Boxes (Pack of 3), Catalog, Jun. 12, 2023, 5 pages.

\* cited by examiner

STACKABLE ELECTRICAL WORK BOXES
WITH EXTENDABLE PULL HANDLE TAB
AND EASY INSERTION SURFACES

FIELD OF THE INVENTION

The present invention relates to stackable electrical new work/old work boxes preferably with an easy insertion curved radius corner or mitered corner surface and an extendable, slidable finger pull handle tab, wherein the stackable new work/old work boxes nest within each other, so that the back of a new work/old work box which protrudes outward can nest and extend inward into the front opening of another new work/old work box.

BACKGROUND OF THE INVENTION

There exists a number of stacked electrical new work/old work boxes, which may have different interior geometric shapes.

For example, note that a Chinese Patent No. CN210669404 (U) shows in drawing FIG. 4 a series of open rectangular boxes which have no projections inside, so they are easy to stack.

The six US Patents of Hubbell Inc. (inventors Shotey, Baldwin, Cleghorn, Klein, and/or Miserendino) each describe stackable boxes, or in the case of U.S. Pat. Nos. 8,899,431 B1 and 8,710,367 B2, each describe a single box with expandable wings which slide in and out.

U.S. Pat. No. 8,344,249 B1 of Hubbell Inc. (inventors Baldwin, Shotey, and Miserendino) describes an electrical box which has protruding prongs 58 which slide into corresponding recesses 66. But these prongs and recesses are for installation, not necessarily for stacking boxes in nested configurations.

However, nested boxes are shown in U.S. Pat. No. 8,288,650 B1 of Hubbell Inc. (inventors Baldwin, Cleghorn, and Shotey) where for example a single one-gang box 10 can have a top recess groove into which a downward protrusion of an encircling two-gang box can nest. But this is mainly for installation, not for shipping purposes.

Moreover, nested boxes for shipping purposes are also shown in U.S. Pat. No. 8,253,017 B1 of Hubbell Inc. (inventors Cleghorn, Baldwin, Shotey, and Dieterly). See drawing FIGS. 1, 3, 5, 9, 10, 12, and 14.

However, the nesting portions of Hubbell '017 appear to be a fastener protrusion with a hole for a fastener, being insertable within a linear recess. The geometry of the corners of the boxes appears to be cut off to mate together.

Another nesting stackable electrical box is shown in U.S. Pat. No. 8,253,016 B1 of Hubbell Inc. (inventors Baldwin and Cleghorn) which describes simple stackable boxes, where linearly extending protruding ribs slide within concave spaces in adjacent stackable electrical boxes. FIG. 1 of Hubbell '016 shows the ribs in opposite corners of the box and FIG. 3 shows two pairs of the linearly extending protruding ribs being provided in respective side walls of the boxes.

FIG. 13 of U.S. Pat. No. 6,953,894 B2 of Ungerman and Kiely, assigned to Bridgeport Fittings Inc., describes nested boxes where the boxes all appear to have no geometric protrusions, shoulders, or recesses to be manipulated or removed. Each box in Ungerman '894 has slightly tapered rounded top and bottom walls which slide into each other, without any interior geometric parts to be removed or rearranged.

U.S. Pat. No. 4,365,108 of Bright describes a power pedestal for electrical wiring that nests over a lower component. There does not appear to be any interior protrusions or recesses. Bright also has an exterior hasp 24 for locking the stackable portions together.

Other patent references disclose sliding tabs, mostly for inserting a screw or fastener therethrough, but outside the walls of the box. But none of them appear to provide a sliding flush pull handle tab.

For example, U.S. Pat. No. 8,242,360 B2 of Bercy describes a single electrical work box having rotatable tabs forming exterior mounting blocks for fasteners.

U.S. Pat. No. 5,841,068 of Umstead discloses an electric box having an adjustable positioning tab 142 on the exterior of the box that can be moved to fit a drywall to which the box is attached. Tab 142 has linear slots 138 for adjustable positioning of fasteners through the slots.

U.S. Pat. No. 5,088,246 of Brown describes a conduit box for wiring, which has a removable lid 20.

US Patent Application Publication 2012/0186871 A1 of Roberts describes an electrical box with a front portion 62 that slides within a rear box 28, but there are no interior protrusions, however, there are provided pivotable stop members 80, 82. These stop members are tabs but not manual holding tabs.

With respect to foreign patents, United Kingdom Patent GB 2411525 A of Hayden describes nested electrical boxes, but the interiors of the boxes do not appear to have nay protrusions or recesses to be geometrically manipulated or removed.

Canadian Patent 3013486 of Kummer, assigned to Southwire Company, describes exterior tabs 802/814 for holding a junction box 805 adjacent to an electrical work box 800.

World Intellectual Property Organization Patent Publication WO 2022/212142 A1 of Hubbell Inc. describes an electrical work box with moveable mounting arms 60 with threaded screw hole 64. but the moving arms do not slide (they pivot), and they are not used for holding. Rather, they are pivotable members with holes for fastening the work box to a wall or stud.

While the above patents disclose stackable nesting electrical work boxes, they do not appear to have the interior geometric complexity of the stackable boxes of the present invention.

Moreover, while there are many electrical work boxes with exterior pivotable tabs, they mainly appear to be for accommodating fasteners through the tabs, but not for holding a work box in a slidable finger pull handle tab with one finger of the installer's hand to prevent dropping the box inside a hole in the wall to which the box should be attached.

OBJECTS OF THE INVENTION

An object of the present invention is to geometrically modify the interior of the electrical boxes so that they would nest and fit within each other, for efficient transport and storage.

This includes positioning the interior components that had to be eliminated or had to have respective geometrically shaped mirror images with the adjacent exterior and interior surfaces of two adjacent stacked electrical boxes.

It is also an object of the present invention to provide stackable new work/old work boxes, which also include new work/old work boxes which are attached by pivotable toggles, where the toggles are positioned so that they do not interfere with the stacking of the new work/old work boxes.

It is yet another object to provide an electrical box with an extendable, slidable finger operable pull handle for an installer to use a single finger to hold a new work/old work box in place, in a cut-out hole in a wall or adjacent to a stud for new work boxes, to prevent the work box from falling out of position during installation.

It is yet another object of the present invention to provide the aforementioned slidable pull handle finger tab to slide in and out of the new work/old work box on parallel channels or tracks, and to be exposed when pulled outward, whereby an installer can grasp the finger tab, and grasp together the thumb and forefinger in a tight grip to hold the new work/old work box in place while being installed, before the box is stabilized with screws or nails into a stud, or via toggles that pivot and slide into grasping position to cutout SHEET ROCK® wall hole until the new work/old work box is stabilized in place, to prevents an installer from dropping the box into the cutout hole in the SHEET ROCK® wall panel, thereby obviating the disadvantage of removing SHEET ROCK®, to retrieve a dropped box from the floor below.

It is a further object to provide a variable set of electrical work boxes where similar gang boxes can stack into each other by virtue of circumferential edge step backs so that exterior protruding convex edges nest into interior, hollow concave receptacle regions.

It is also an object to provide electrical new work/old work boxes with a curved distal nail tab (setback from SHEET ROCK® depth accommodation) and with an opposite curved corner of each box, so that the box can pivot like a seesaw when being manually inserted by the installer into the cut-out in the SHEET ROCK® wall. In that way the new work/old work box can come at any angle into the cutout hole on the opposite side of the box slides at any angle into the SHEET ROCK® cutout hole and the curved edge enables ease of insertion, so that exact perpendicular placement is unnecessary.

For efficient, space-saving shipping and display purposes, it is also an object of the present invention to provide new work/old work boxes which can be configured so that 2-gang new work/old work boxes are stackable within other 2-gang work boxes, and multiple-gang electrical work boxes are stackable with other multiple-gang electrical boxes of the same numerical gang (i.e., two-gang boxes stackable within other two-gang boxes, three-gang boxes stackable within other three-gang boxes, four-gang boxes stackable within other four-gang boxes, five-gang boxes stackable within other five-gang boxes, six-gang boxes stackable within other six-gang boxes).

However, preferably, it is yet another object of the present invention to provide that the new work/old work boxes can be stacked in serially numbered new work/old work boxes, so that a 2-gang new work/old work box is stackable within a 3-gang new work/old work box, which is stackable within a 4-gang new work/old work box, which is stackable within a 5-gang new work/old work box, which is then stackable within a 6-gang new work/old work box and therefore forming a triangular configuration in profile. Therefore, each set of stacked new work/old work boxes includes the boxes being serially stacked within respective larger-gang boxes, so that each stackable set includes a single 2-gang through a single 6-gang new work/old work box.

It is also an object of the present invention to provide similar numbered gang boxes, which can stack into each other by virtue of round or rectangular circumferential edge setbacks provided on each respective new work/old work box, so that convex edges nest into respective concave receptacle regions.

It is a further object of the present invention to provide new work/old work boxes with accessory projections or steps inside the new work/old work box which are geometrically manipulated whereby any projections or steps inside the new work/old work box are geometrically manipulated first, so that they will fit in the recesses or channels of a wall of an adjacent new work/old work box, which has also been geometrically manipulated.

It is yet another object to provide nesting, stackable new work/old work boxes with an exterior wall having a curved radius corner shoulder or a mitered corner, which is rounded, for ease of installation of a box into a hole in the wall, whereby the curved radius rounded corner shoulder of the workbox enables the installer to slide the rounded curved radius corner or mitered corner in place in a wall panel cut-out hole, and without relying on any protruding angular corners contacting the cut-out opening of the wall, into which the new work/old work box is inserted.

It is also an object of the present invention to provide a flat, curved distal edge nail tab being setback about ½ inch from the top and bottom walls of the outer edges of the new work/old work box, to enhance the SHEET ROCK® cut-out insertable accommodation, so that the box can pivot like a seesaw when being inserted into the cutout in the SHEET ROCK® wall, whereby further the new work/old work box can be inserted into the cut-out at any angle and whereby the curved edge enables ease of insertion, so that exact perpendicular placement is unnecessary.

For shipment, it is also an object to convergently nest the new work/old work boxes such that the nesting includes a 2-gang box in a 3-gang box, a 3-gang box in a 4-gang box, a 4-gang box in a 5-gang box, or a 5-gang box in a 6-gang box to make a set (or combined with multiples of same size gang in each other while set is triangularly convergent in profile).

It is yet also an object to provide new work/old work boxes being attachable to a wall stud and which can preferably include an accessory angled removable and repositionable leveling wedge, which can be loosely stored in the workbox and in use where the a portion of the accessory leveling wedge provides a surface that is flush with a wall of the new work/old work box, so that a recessed wall of the new work/old work box is extended upward by the thickness height of the accessory leveling wedge, for stability during installation of the workbox in a new work/old work environment.

Other objects of the present invention will become apparent from the details of the specification, claims and drawings of the present invention.

SUMMARY OF THE INVENTION

In keeping with the aforementioned objects, the present invention includes stackable new work/old work electrical boxes, with a curved radius corner or mitered corner edge and setback features, so that, for these new work/old work boxes, the curved radius corner or mitered corner edges allow for an easy, smooth insertion of each new work/old work electrical box into a cutout hole in a SHEET ROCK® wall panel, in combination with a seesaw pivoting of the new work/old box during insertion.

Also, each new work/old work box has a surface, which is set back about ½ inch, so that the ½ inch setback will accommodate a ½ inch SHEET ROCK® wall panel in the ½ inch setback, whereby a nail tab extending from the new work/old work box rests flush with the inside wall of the SHEET ROCK®, adjacent to the cut-out in the wall panel.

Easy Insertion Curved Radius Corner or Mitered Corner Surface

The stackable boxes also include a unique ease of installation feature, namely a curved radius corner or mitered corner shoulder, which is rounded, for ease of installation of a new work/old work box into a cut-out hole in the wall panel. The rounded curved radius corner or mitered corner shoulder of the work box enables the rounded radius curved corner to slide in place without any protruding angular corners contacting the opening of the wall, into which the work box is inserted.

For example, the rounded curved radius corner or mitered corner of the new work/old work box is provided for making it easier for an installer to insert a 2-gang electrical box into the cut-out hole in the SHEET ROCK® wall panel. This improvement includes the feature that a side wall, at the beginning of smaller profile rearward compartment, has an indented rear corner having the curved radius corner or mitered corner extending the smaller profile height of the rear compartment of the electrical work box, which makes it easier to pivot the installer's movement of the electrical workbox into the cut-out hole, like a pivoting seesaw movement back and forth, without having to directly insert the work box straight in, at 90 degrees into the cut-out hole in the wall panel.

Accessory Flush Surface Leveling Wedge

The aforementioned accessory leveling wedge for new work/old work boxes provides the flush edge when the box is being aligned in place at a perfect right angle adjacent to a wall stud. Therefore, a flush surface is provided where the surface of the work box meets the wall stud.

The accessory 90° angled leveling wedge provides a flush surface when a new work/old work box is being aligned in place to the wall, so that a flush surface is provided where the flat surfaces of the work box and wall stud meet. The purpose of the leveling wedge is to compensate for the step down in the mounting wall of the work box.

The new work/old work box normally has setback portions of outer walls to facilitate stacking of the work boxes, so that a gap exists when attaching the new work/old work box to a stud. The leveling wedge has connections to connect the leveling wedge to the surface of the work box.

The stackable new work/old work boxes also include the angled removable and repositionable leveling wedge, which can be inserted loosely for storage in the workbox before the new work/old work box is installed in the wall, so that a portion of the leveling wedge provides a surface that is flush with, and in positional register with, the outer surface of the side base of the new work/old work box so that the base side portion of the new work/old work box is extended upward by the height of the leveling wedge to provide a top to bottom or side to side surface that is flush with the wall stud to which the new work/old work box is being installed.

Slidable Finger Pull Handle Tab

Optionally, at least one of the respective outside surfaces includes at least one user-adjustable slidable pull handle tab integrally and slidably attached on at least one outside surface of each work box, which can be a stackable new work/old work box, a non-stackable new work/old work box, a stackable new work box, or a non-stackable new work box.

For example, each new work/old work box optionally includes the slidable finger pull handle tab that is provided between parallel tracks or channels on a side of the new work/old work box, to slide upwards and outward at the user's convenience to hold the new work/old work box while inserting the box into a hole in a SHEET ROCK® wall panel, or when fastening a new work box to an exposed stud in a new construction project.

When new work/old work boxes are attached directly by a fastener through the box wall to an exposed building stud, the slidable finger pull handle tabs are not as important as they are for new work/old work boxes to be installed within a cut opening of a wall panel, either by slidable toggles grasping the edges of the cut opening in the wall panel, or by a direct fastener such as a screw to a stud, if the stud happens to be adjacent to the cut opening, which often is not the case, thereby requiring the toggles (with or without auxiliary non movable tabs engageable with the cut opening) to hold the new work/old work box in place.

Therefore, the slidable pull handle tabs are crucial for holding the new work/old work box at the cut-out opening so that the new work/old work box does not inadvertently fall below the wall panel, which would necessitate the unfortunate cutting of another portion of the wall panel to retrieve the fallen new work/old work box, and then repairing that cut portion of the wall panel back in place without the hole to retrieve the fallen new work/old work box.

The new work/old work box preferably includes the slidable finger pull handle tab that is provided between parallel tracks or channels on a side of the new work/old work box to slide upwards at the user's convenience to hold the new work/old work box while inserting the new work/old work box into a hole in a SHEET ROCK® wall panel or fastened to an exposed building stud.

Each user-adjustable slidable pull handle tab, for new work/old work boxes, is slidably movable between respective extended and retracted positions for convenient user installation positioning of a selected electrical work box to facilitate ease and convenience in the process of new or renovative new work/old work box electrical construction.

While not as important for installing new work boxes directly on a stud, where there is no wall panel with a cut opening, for convenience it helps the installer hold the new work/old work box is placed directly on the stud, without dropping the new work box to the floor.

Therefore, the one or more user-adjustable slidable tab with a finger-graspable aperture is provided for user convenience in grasping and pulling each user-adjustable slidable pull handle tab between the respective retracted and extended positions for positioning the work box, during installation of the work box at a site.

The slidable finger pull tab slides in the tracks to be exposed outward, whereby an installer can grasp the finger pull handle tab in place. The pull handle tab is positioned on a surface of the new work/old work box.

An optional small linear cutout is provided on distal surface of the slidable finger tab to accommodate installer's fingernail, or a flat head screwdriver, to enable the installer to pull out the slidable finger tab. The new work/old work box is stabilized with screws or nails into an available stud, or else, via toggles that pivot and slide into grasping position to the cutout SHEET ROCK® wall cut-out hole until the new work/old work box is stabilized in place in the cutout hole of the SHEET ROCK® wall panel.

Use of the slidable finger tab prevents the installer from dropping the new work/old work box into the cutout hole in the SHEET ROCK® wall panel, thereby obviating the need for removing more SHEET ROCK® to retrieve the dropped new work/old work box from the floor below, behind the SHEET ROCK® wall panel.

Accessory Nail Tab

For new work/old work boxes that need to be set inside a SHEET ROCK® wall panel cutout hole, one side of the box has a curved distal end nail tab (setback to accommodate for SHEET ROCK® wall thickness of about ½ inch, but an opposite proximal wall is rounded, so that the box can pivot like a seesaw when being inserted into the cut-out hole in the SHEET ROCK® wall. In that way the box can be inserted smoothly at any angle to the cut-out hole and the curved edge enables ease of insertion into the cut-out hole, so that exact 90°, direct placement, or removal of large outside nail or screw tabs, are unnecessary.

The nail tab with an arcuate distal edge is rounded to assist in pivoting into a cutout hole in the SHEET ROCK®, so that it overlaps the adjacent portion of the cut-out hole and provides contact holding strength of the nail tab against the inside wall of the adjacent SHEET ROCK® panel, which adds stability to the installation.

The setback of ½ inch for the nail tab is provided, so it will accommodate the ½ inch thickness of the SHEET ROCK® panel in the setback, whereby the nail tab rests flush with the inside wall of the SHEET ROCK®. Holes are provided in nail tab for inserting nails or screws into adjacent studs, if available.

Stacking Of Nested New Work/Old Work Boxes

The new work/old work boxes can be multiple nested in each other for efficient space saving shipping or commercial display. The same is true for round work boxes, which can also be multiple nested in each other for efficient space saving shipping or commercial display.

For shipment, they can be convergently nested sequentially with a 2-gang box in a 3-gang box, which is then in a 4-gang box, inside a 5-gang box and finally in a 6-gang box set which, as shown in FIG. 26, as triangularly convergent. Alternatively, shipment can include multiple, same size gang new work/old work boxes, which are nested together in each other.

Two Types of Sets of Stackable Embodiments

For definition purposes, there are two sets of distinct stackable new work/old work boxes as follows:
1. SG-smart "Greeny"™—new work/old work, adjustable depth" stackable boxes with an auxiliary slidable finger pull handle tab to permit the installer to hold a box being inserted in a SHEET ROCK® cut-out hole without the disadvantage of the box falling into the hole before installation and requiring the SHEET ROCK® wall to be taken apart to retrieve the dropped box.
2. ST-Smart Toggle™—old work stackable boxes, where the new work/old work boxes often need to be fastened in cutout holes of SHEET ROCK® wall panels, without nearby studs, by pivoted toggles, holding the boxes in holes cut in the SHEET ROCK® wall panels.

Therefore, the present invention relates to stackable electrical new work/old work boxes, preferably with a slidable finger pull handle tab with the trade name "Greeny" ™, wherein the stackable new work/old work boxes nest within each other, so that the back of a new work/old work box, which protrudes outward, can nest and extend inward into the front opening of another adjacent, new work/old work box. The projections or steps inside and outside the new work/old work box are geometrically manipulated. Any projections or steps inside the new work/old work box are geometrically manipulated first, so that they will fit in the recesses or channels of a wall of an adjacent new work/old work box, which has also been geometrically manipulated.

To facilitate stacking and nesting, all similar gang boxes can stack into each other by virtue of the exterior of same gang boxes having circumferential edge step backs so that adjacent protruding edges nest into concave receptacle regions of adjacent boxes.

The new work/old work boxes can be configured so that single-gang new work/old work boxes are stackable within other single-gang work boxes, and multiple-gang new work/old work boxes are stackable with other multiple-gang boxes of the same numerical gang (i.e., 2-gang boxes stackable within other 2-gang boxes, 3-gang boxes stackable within other 3-gang boxes, 4-gang boxes stackable within other 4-gang boxes, 5-gang boxes stackable within other 5-gang boxes, and 6-gang boxes stackable within other 6-gang boxes).

However, preferably, the new work/old work boxes can be stacked and oriented in serially subsequently numbered new work/old work boxes, so that the 2-gang new work/old work box, is stackable within a 3-gang new work/old work box, which is stackable within a 4-gang new work/old work box, which is stackable within a 5-gang new work/old work box, which is then stackable within a 6-gang new work/old work box. Therefore, each set of stacked new work/old work boxes include the boxes serially stacked within respective larger-gang boxes, so that each stackable set includes a single 2-gang through a single 6-gang new work/old work box, with the 1-gang new work/old work box being small enough to rest loosely with the set of other gang boxes.

In general, for multiple stackable new work/old work boxes, each nestable stackable storable electrical new work/old work box comprises an open 5-sided box having a substantially rectangular cross-section with four integral substantially planar sides and an integrally planar back; wherein further the respective sides and back of the open 5-sided new work/old work box comprise respective inside surfaces and outside surfaces of adjacent electrical new work/old work box.

The inside of the new work/old work box includes a cavity having a substantially rectangular box-like cross sectional shape; wherein further the substantially rectangular cross-section shaped cavity includes a tapered, shallow truncated shape comprised of the four integral substantially planar sides and the integrally planar back.

The new work/old work box further has one or more integral shoulder setbacks projecting inwardly from at least one of the aforementioned cavity's respective inside surfaces.

The shallow-angled truncated shape of the rear protrusion compartment permits the nestable back-first insertion of the electrical new work/old work box into another of its kind.

Preferably, the nestable insertion of the electrical new work/old work box into another of its kind creates a combination of two or more stacked electrical new work/old work boxes, wherein there comprises a first nestable new work/old work box inserted into a respective second nestable receiver new work/old work box. However, the new work/old work boxes are serially stacked so that a two-gang new work/old work box is stackable within a 3-gang new work/old work box, which is stackable within a 4-gang new work/old work box, which is stackable within a 5-gang new work/old work box, which is then stackable within a 6-gang new work/old work box. Therefore, each set of stacked new work/old work boxes include the boxes being serially stacked within respective larger-gang boxes, so that each stackable set includes a 2-gang through a single 6-gang new work/old work box. Single-gang boxes, while not stackable, are small enough to be placed inside a two-gang box.

The at least one inside surface shoulder setback of the second nestable receiver new work/old work box engages with the outside back surface of the inserted nestable new work/old work box, to stop the insertion of the inserted new work/old work box at a point limiting the insertion depth of the inserted new work/old work box, creating at least one nested pair of electrical new work/old work boxes, one within the other.

With respect to the electrical work boxes, they are preferably new work/old work boxes attached by pivotable toggles to adjacent surfaces surrounding a cut-out hole in a wall panel board covering wall studs, or combinations of internal fasteners and external toggle fasteners.

The stackable electrical work boxes are provided, wherein the stackable boxes nest within each other, so that the back of a new work/old work box which protrudes outward can nest and extend inward into the front opening of another new work/old work box. The projections or steps inside the new work/old work boxes are geometrically manipulated. Any projections or steps inside the new work/old work box are geometrically manipulated before so that they will respectively fit in the recesses or channels of a wall of an adjacent respective new work/old work box, which has also been geometrically manipulated.

The interior geometries of the stackable new work/old work box are geometrically manipulated, so that any interior channels or projections mounts are configured to mesh and nest with exterior mirror image configurations to provide stackability of adjacent new work/old work boxes, respectively, within each other.

The 1-gang electrical new work/old work box has an open front area, top and bottom rearward extending walls which are connected on each side by left and right-side walls. The rear of the new work/old work box is a generally closed end wall, which is opposite the open front area.

The new work/old work box has a hollow chamber, having a front hollow portion which is generally rectangular in shape, and a back hollow portion, which is smaller in volume than the front hollow portion, so that it can accommodate the front walls of an adjacent stackable respective new work/old work box over the smaller back hollow portion of an adjacent new work/old work box, where the four front edge walls of the adjacent new work/old work box nest against the wider walls of the front hollow portion, so that the adjacent work box nests with the first new work/old work box.

The front portion of the upper wall of each stackable new work/old work box includes a downwardly extending channel holding block having an interior fastener holding channel. The rear edge of the channel holding block is integral with a first downwardly extending portion of the box where the rear of the front portion of the channel box is a solid stop, so that an adjacent stackable box will have a front end which nests together with the rear of the downwardly extending portion of the new work/old work box.

To accommodate the aforementioned channel holding block, of an adjacent stacked rectangular double 2-gang old box, a step down shelf is provided on the exterior of the double 2-gang new work/old work box extending from the end of the channel holding block to the rear of the double 2-gang new work/old work box, leaving a shoulder extending slightly below the top of the double 2-gang new work/old work box towards the rear of the double 2-gang new work/old work box with a cutout portion for wiring at the rear of the double 2-gang new work/old work box. The step-down shelf also includes a breakout cutout portion at the rear for accommodating wiring.

Other peaked clamping devices 26 are provided at the rear end of the stepdown shelf and also at the bottom of the double 2-gang new work/old work box, which is a mirror image of the top of the double 2-gang new work/old work box, which each respectively has the shoulder and stepdown shelf, except that on the bottom, the shoulder of each is on the left side of the double 2-gang new work/old work box, as compared to on the right side of the top of the double 2-gang new work/old work box, and the stepdown shelf on the bottom is on the right side of the bottom of the double 2-gang new work/old work box, as compared to being a mirror image located on the left side of the top of the double 2-gang new work/old work box. Therefore, there are multiple knockouts, each located at the rear of the back hollow portion of the double 2-gang new work/old work box, with V-shaped clamping devices 26, which can be integral wire clamps, located extending inward from the stepdown shoulders on opposite sides of the double 2-gang new work/old work box, or are flattened round knockouts located on any surface of the double 2-gang new work/old work box extending beyond the front portion of the double 2-gang new work/old work box, having the channel-holding block therein.

By virtue of the mirror image placement of the channel-holding blocks on the top and bottom inner walls of the single 2-gang box, there is a corresponding adjacent area between the top shelf of the rear of the single 2-gang box and the top of the shoulder below and adjacent to the top shelf of the rear of the double 2-gang box. Therefore, the geometry of the positive channel-holding blocks, being mirror images inside and outside of the lower stepdown shoulders of the box enables adjacent double 2-gang boxes to nest together in a stackable fashion.

The same geometry is repeated in multiple-gang boxes, such as two-gang, three-gang, and four-gang electrical new work/old work boxes. The round work boxes each have a similar nesting configuration, but of a round exterior shape with front and rear portions meshing and nesting with front and rear portions of adjacent round work boxes, each with corresponding stepdown shoulders adjacent to top shelf portions.

It goes without saying that the slidable pull handle tab can also be used for larger new work/old work boxes, such as, but not limited to, two-gang, three-gang, four-gang or round new work/old work boxes.

Stackable Round Work Boxes

For round electrical boxes for ceiling or wall sconce installations, the dimensions vary from the rectangular 1-gang, 2-gang, 3-gang, 4-gang new work/old work boxes, etc., but the round new work/old work boxes are also stackable, so that the interior configurations of each round box match the exterior configurations of adjacent round boxes being stacked together. The stackable electrical round work box further comprising a removable accessory leveling wedge which provides a flat surface on the mounting side of the round box for attachment to a wall stud.

BRIEF DESCRIPTION OF THE DRAWINGS

The present invention can best be understood in connection with the accompanying drawings. It is noted that the invention is not limited to the precise embodiments shown in the following drawings, in which.

DETAILED DESCRIPTION OF THE INVENTION

As used throughout this specification, the word "may" used in a permissive sense (i.e., meaning having the potential to, or being optional), rather than a mandatory sense (i.e., meaning must), as more than one embodiment of the invention may be disclosed herein. Similarly, the words "include", "including", and "includes" mean including but not limited to.

The phrases "at least one", "one or more", and "and/or" may be open-ended expressions that are both conjunctive and disjunctive in operation. For example, each of the expressions "at least one of A, B and C", "one or more of A, B, and C", and "A, B, and/or C" herein means all of the following possible combinations: A alone; or B alone; or C alone; or A and B together; or A and C together; or B and C together; or A, B and C together.

Also, the disclosures of all patents, published patent applications, and non-patent literature cited within this document are incorporated herein in their entirety by reference. However, it is noted that the citing of any reference within this disclosure, i.e., any patents, published patent applications, and non-patent literature, is not an admission regarding a determination as to its availability as prior art with respect to the herein disclosed and claimed apparatus/method.

Furthermore, any reference made throughout this specification to "one embodiment" or "an embodiment" means that a particular feature or characteristic described in connection therewith is included in at least that one particular embodiment. Thus, the appearances of the phrases "in one embodiment" or "in an embodiment" in various places throughout this specification are not necessarily all referring to the same embodiment. Therefore, the described features, advantages, and characteristics of any particular aspect of an embodiment disclosed herein may be combined in any suitable manner with any of the other embodiments disclosed herein.

Figure 1:
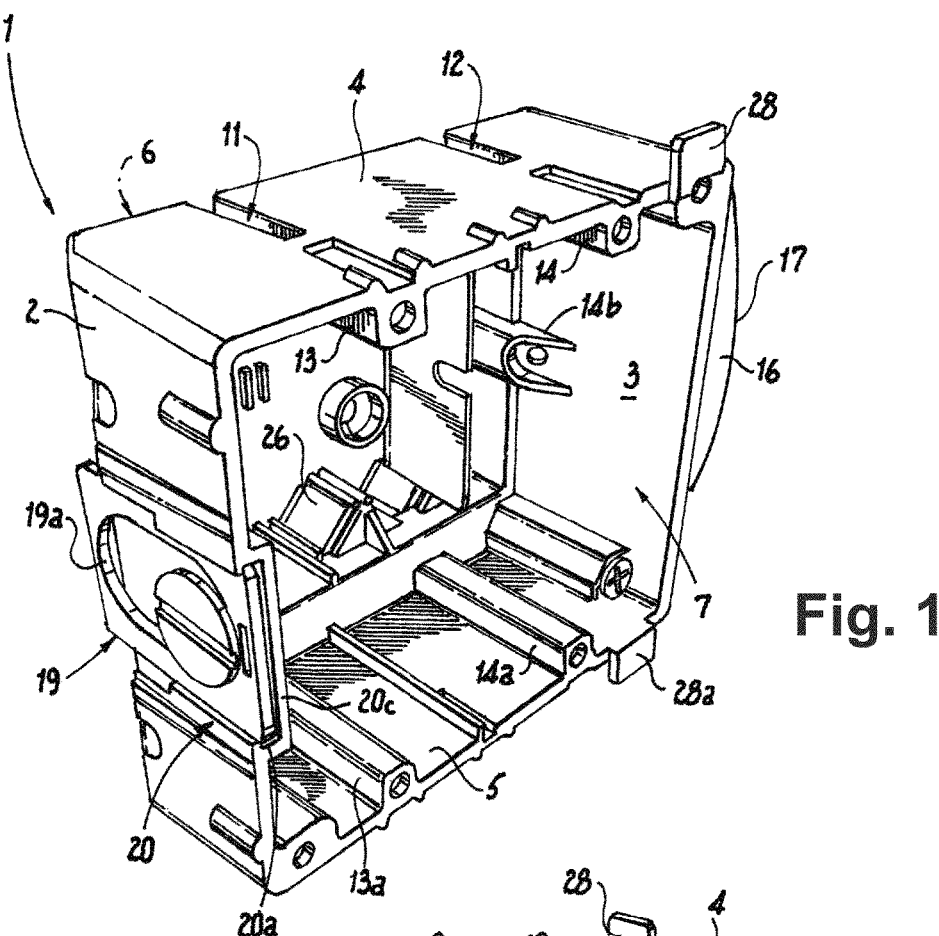
FIG. 1 is a front perspective view of a double two-gang outlet work box of the present invention.

FIG. 1 shows the 2-gang electrical workbox 1 of the present invention. The electrical work box 1 includes a 5-sided geometric box 1 with two parallel side walls 2 and 3, a top wall 4 and a bottom wall 5, all connecting to a rear wall 6, with a front opening 7. For old work installations, one or more tabs 28 extend up from any outer edges of the work box 1 to help hold the work box 1 in place within a cut-out hole in a SHEET ROCK® wall panel WP. The front opening 7 has only interior projections, such as fastener mounts 13b, 14b for screws 22, or peaked clamping devices 26, or round knockouts, for wiring to extend therethrough, near the side walls 2 and 3, the top wall 4 and the bottom wall 5, each connected to the rear wall 6, so that the opening 7 has a wide cavity space for an adjacent rear portion of another work box 1 to extend into the cavity space of front opening 7 of work box 1, for nesting and stacking two or more work boxes together. The rear wall 6 includes a rearwardly extending rear protrusion compartment 8 having a top sub wall 8a which is reduced in height than the height of top wall 4 and is stepped with setbacks 9,10, so that it is lower than the top wall 4. Indented side walls 8b and 8c of rear protrusion compartment 8 are reduced in width than the width of the work box 1 between side walls 2 and 3 and are also stepped with setbacks 9, 10, extending side walls 2 and 3. Rear protrusion compartment 8 also has a bottom wall 8d, which is located higher than the bottom wall 5 of work box 1. As a result, rear protrusion compartment 8 has a smaller profile that the front portions of work box 1 formed between side walls 2 and 3, top wall 4 and bottom wall 5.

Figure 2:
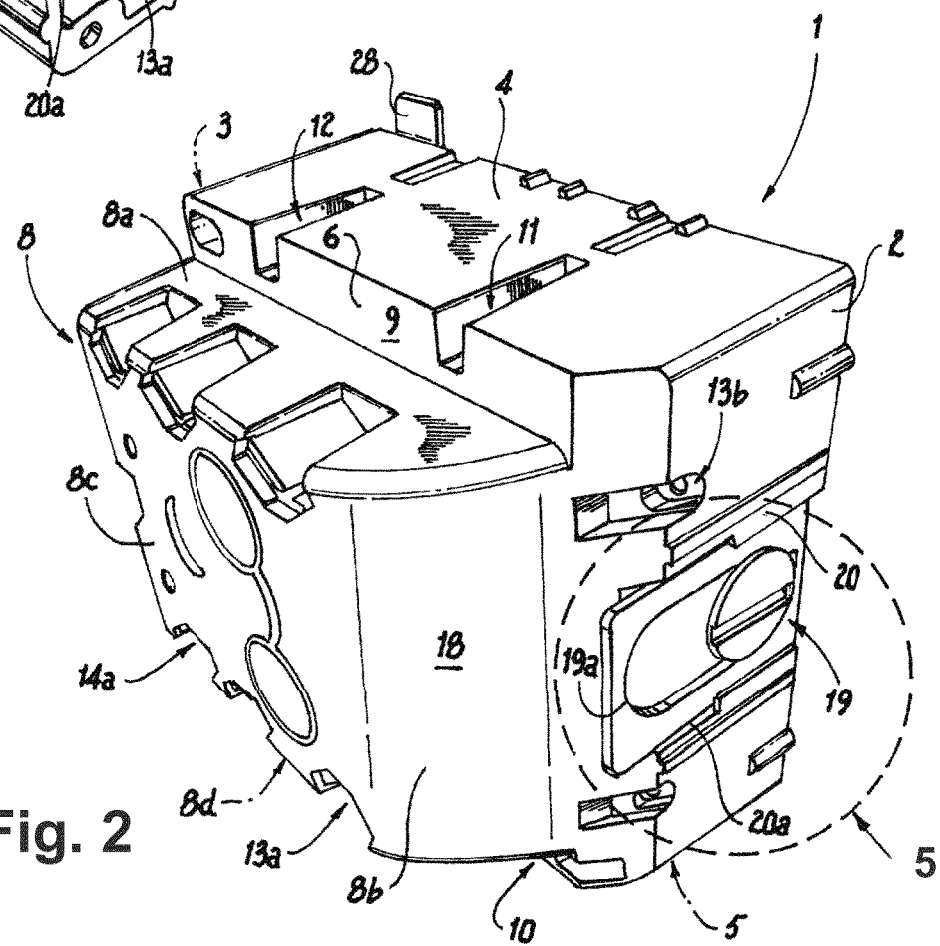
FIG. 2 is a rear perspective view of the double two-gang outlet work box, showing a rear corner having a curved radius, and a slidable finger pull handle tab.

For example, FIG. 2 shows the rear protrusion compartment 8 of the double outlet 2-gang electrical work box 1. The rear protrusion compartment 8 has top and bottom setbacks 9 and 10 to accommodate the rear protrusion compartment being able to fit completely within the opening 7 of an adjacent workbox 1. For old work installations, one or more tabs 28 extend up from any outer edges of the work box 1 to help hold the work box 1 in place within a cut-out hole in a SHEET ROCK® wall panel WP. The top wall 4 of the workbox 1 has two or more partial concave cavities 11 and 12 to accommodate the respective two or more downward projections 13 and 14, which slide into the two or more partial concave cavities 11 and 12 of the top wall 4. The opening 7 also includes internal fastener mounts 13b and 14b, as well as the bottom wall 5 has upwardly extending fastener projections 13a and 14a extending up from the bottom wall 5. Rear wall 6 has two or more partial concave cavities 11a and 12a to nest with two or more upward projections 13a and 14a.

FIGS. 1 and 2 also show the 2-gang electrical work box 1 having structural improvements to make it easier to insert the 2-gang electrical box 1 into a cut-out hole 15 in a SHEET ROCK® wall panel WP in a wall. FIGS. 1 and 2 are exemplary only, and the features discussed herein apply to any numbered gang boxes.

For example, as in FIGS. 1 and 2, one side of the electrical workbox 1 has a flat rounded edged substrate curved edged nail tab 16 with nail holes 16a, 16b, 16c, 16d and 16e for nailing the electrical workbox 1 into a stud if available near the cutout hole 15. The curved edged nail tab 16 has a curved distal edge 17 and has setback 9a on the side wall 2 about ½ inch to provide for clearance for the thickness of the SHEET ROCK® wall panel WP between the edge of the opening 7 and the curved edged nail tab 16, so that the curved edged nail tab 16 provides some structural strength as it rests against the inside of the SHEET ROCK® wall panel WP having the cut-out hole 15 therein. An additional improvement is provided for making it easier for an installer to insert the 2-gang electrical box 1 into the cut-out hole 15. This improvement includes the feature that the opposite sidewall 3, at the beginning of smaller profile rearward protrusion compartment 8, has an indented rear corner 18 having a curved radius or mitered corner extending the smaller profile height of the rear protrusion compartment 8 of the electrical work box 1, which makes it easier to pivot the movement of the electrical workbox 1 into the cutout hole 15 in the SHEET ROCK® panel like a seesaw movement back and forth, without having to directly insert the rear protrusion compartment 8 at 90 degrees into the hole. For old work installations, one or more tabs 28 extend up from any outer edges of the work box 1 to help hold the work box 1 in place within a cut-out hole in a SHEET ROCK® wall panel WP.

FIGS. 1, 2, 5, 6, 10, 11, 15, 16 and 27-29 also show at least one of the respective outside surfaces includes at least one user-adjustable slidable pull handle tab 19 integrally and slidably attached on at least one outside surface of each work box 1, which can be a stackable new work/old work box 1, a non-stackable new work/old work box (not shown), or a non-stackable new work box (not shown). Slidable pull handle tab 19 also includes slot 19a which exposes an aperture hole for an installer to insert a fingertip within the aperture hole, to hold the work box 1 in place in a cut-out hole 15 within a SHEET ROCK® wall panel WP. This pull handle tab 19 prevents the installer from dropping the work box 1 behind the hole and the remaining SHEET ROCK® wall panel WP and avoids the need to cut the remaining SHEET ROCK® wall panel WP with a further removal to enable the installer to retrieve the dropped work box 1. Optionally, the finger pull handle tab 19 can have a small linear slot 19b near its distal end so that the installer can optionally insert the installer's finger nail or a flat head screwdriver into the distal linear slot 19b for grasping and pulling out the finger pull handle tab 19 of the work box 1, to also stabilize the work box 1 within the cut-out hole 15 and avoid dropping the work box 1 below and behind the SHEET ROCK® wall panel WP.

For example, each new work/old work box 1 optionally includes the slidable finger tab 19 that is provided movable between parallel tracks 20 or channels 20a located within a shallow flat track or channel supporting sub-compartment 20c, located on one inside or exterior surface of sides 2 or 3 of the new or old work box 1, to slide the slidable finger tab 19 upwards and outward at the user's convenience to hold the new work/old work box 1 in a preferred location while inserting the work box 1 into the cutout hole 15 in a SHEET ROCK® wall panel WP, or when fastening a new work/old work box 1 to an exposed stud S in a new construction project.

Figure 5:
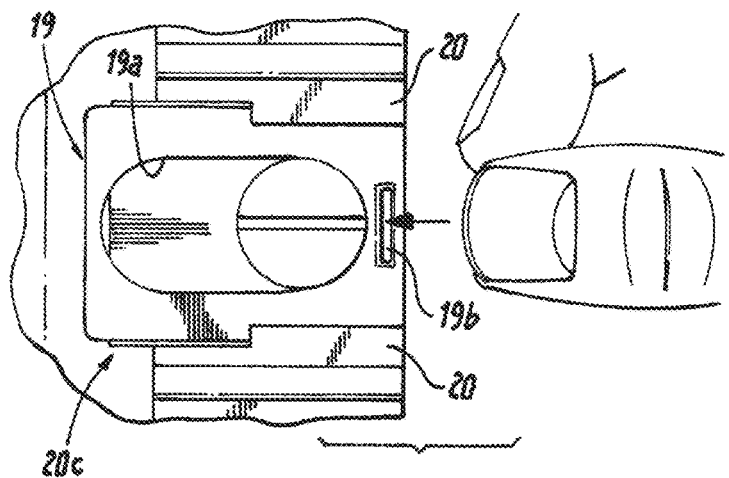
FIG. 5 is a local elevation view taken at view arrow 5 of FIG. 1, showing the approach of a user's thumb to a non-deployed extendable, slidable finger holding tab.
Figure 6:
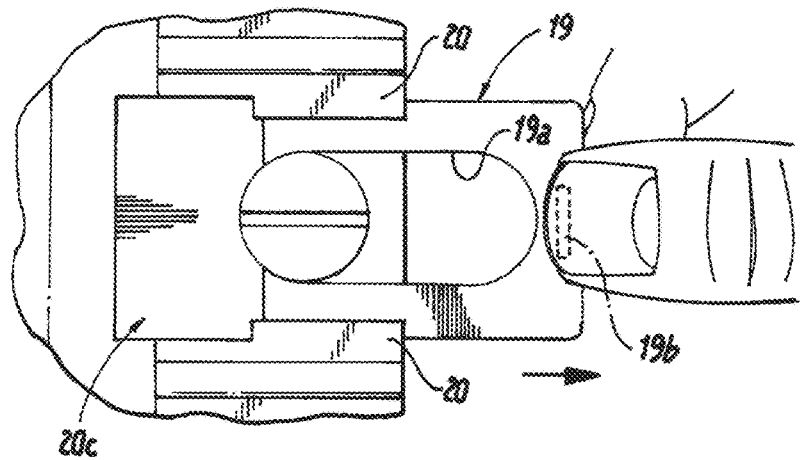
FIG. 6 is like FIG. 5 but showing the user's fingers extending the finger holding tab for holding the box.

Each user-extendable slidable pull handle tab 19, for the new work/old work box 1, is slidable up from shallow flat sub compartment 20c, between respective extended and retracted positions shown in FIGS. 5 and 6 for convenient user installation positioning of a selected electrical new work/old work box 1 to facilitate ease and convenience in the process of installing stackable new work/old work box 1, or any non-stackable new work/old work box 1 (not shown).

While the slidable pull handle tab 19 is best used on a new/old work box 1 to be installed in a cut-out opening 15 in a SHEET ROCK® wall panel WP, so that the user's finger of the hand not holding a screwdriver, can hold the new work/old work box 1 in place so that it will not inadvertently drop down in the cut-out opening 15 in the SHEET ROCK® wall panel WP, it can also be used by attaching a box to a stud.

While not as important for installing new work/old work boxes 1 directly on a stud S, in a new work environment, where there is no wall panel WP with a cut-out opening 15, for convenience it helps the installer hold the stackable new work/old work box 1 in place directly on the stud S, without dropping the new work/old work box 1 to the floor.

Therefore, the at least one user-adjustable slidable pull handle tab 19 has a finger-graspable aperture 19a for user convenience in grasping and actuating said at least one user-adjustable slidable tab 19 between the respective retracted and extended positions shown in FIGS. 5 and 6 for new work/old work box 1 positioning, during installation of the new work/old work box 1 at the cut-out opening 15 of a SHEET ROCK® wall panel WP for either new or old work construction. Optionally, the finger pull handle tab 19 can have a small linear slot 19b near its distal end so that the installer can optionally insert the installer's finger nail or a flat head screw driver, into the distal linear slot 19b for extending the finger pull handle tab 19 outward from the work box 1, to grasp the work box with the installer's finger, and avoid dropping the work box 1 below and behind the SHEET ROCK® wall panel WP.

For old work installations, one or more tabs 28 extend up from any outer edge of the work box 1 to help hold the work box 1 in place within a cut-out hole in a SHEET ROCK® wall panel WP.

Figure 10:
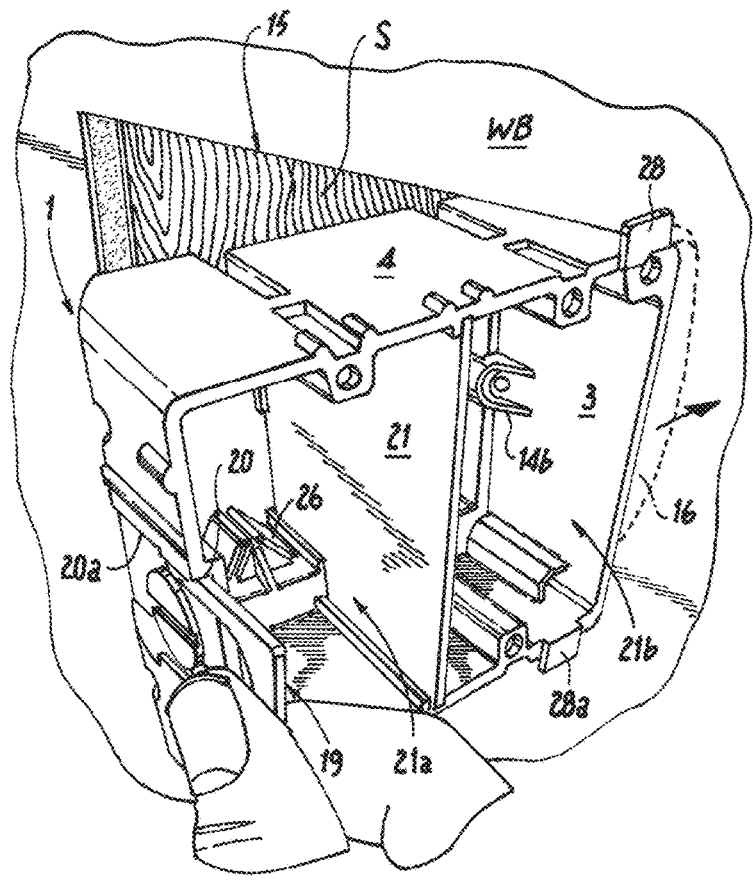
FIG. 10 is a perspective view of the two-gang new work/old work box of FIG. 1 being introduced into a cutout in the SHEET ROCK®, wherein the extended finger holding tab allows the user to maintain a grip on the box, preventing accidental dropping of the work box behind the wall panel.
Figure 11:
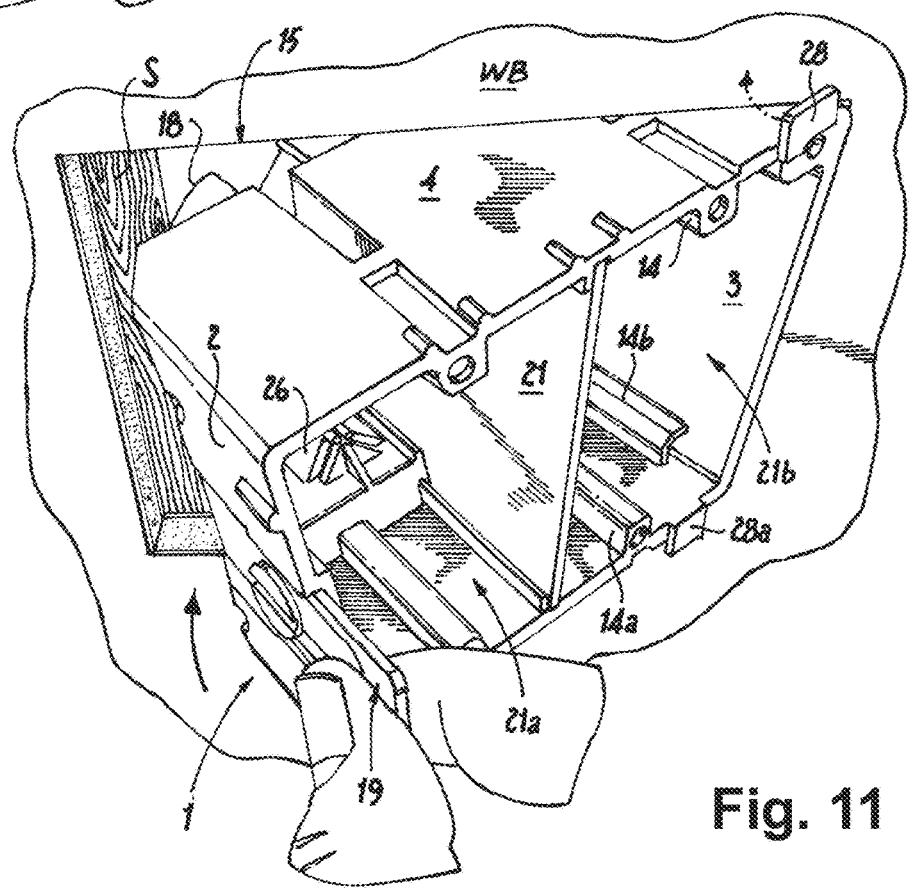
FIG. 11 is a perspective view of the new work/old work box of FIG. 10, wherein the radiused curved corner or mitered corner of the box allows for ease of installation into the SHEET ROCK® cutout.

FIGS. 10 and 11 show the slidable finger pull tab 19 which slides in the tracks to be exposed outward, whereby an installer can grasp the slidable finger pull tab 19. An optional small linear cutout is provided on distal surface of the slidable finger pull tab 19 to accommodate installer's fingernail, or a flat head screwdriver to enable the installer to pull out the slidable finger tab. The new work/old work box is then stabilized with screws or nails into an available stud, or else, via toggles that pivot and slide into grasping position to the cutout SHEET ROCK® wall cut-out hole, until the new work/old work box is stabilized in place in the cutout hole of the SHEET ROCK® wall panel.

Before the new work/old work box 1 is stabilized with screws or nails into a stud, or via toggles that pivot and slide into grasping position to a cutout SHEET ROCK® wall hole 15, the pull handle 19 helps the installer pull the work box 1, until the new work/old work box 1 is stabilized. This prevents the installer from dropping the new work/old work box 1 into the cutout hole 15 thereby obviating the need for removing additional excess SHEET ROCK® wall panel WP material to retrieve a dropped new work/old work box 1 from the floor below.

Figure 3:
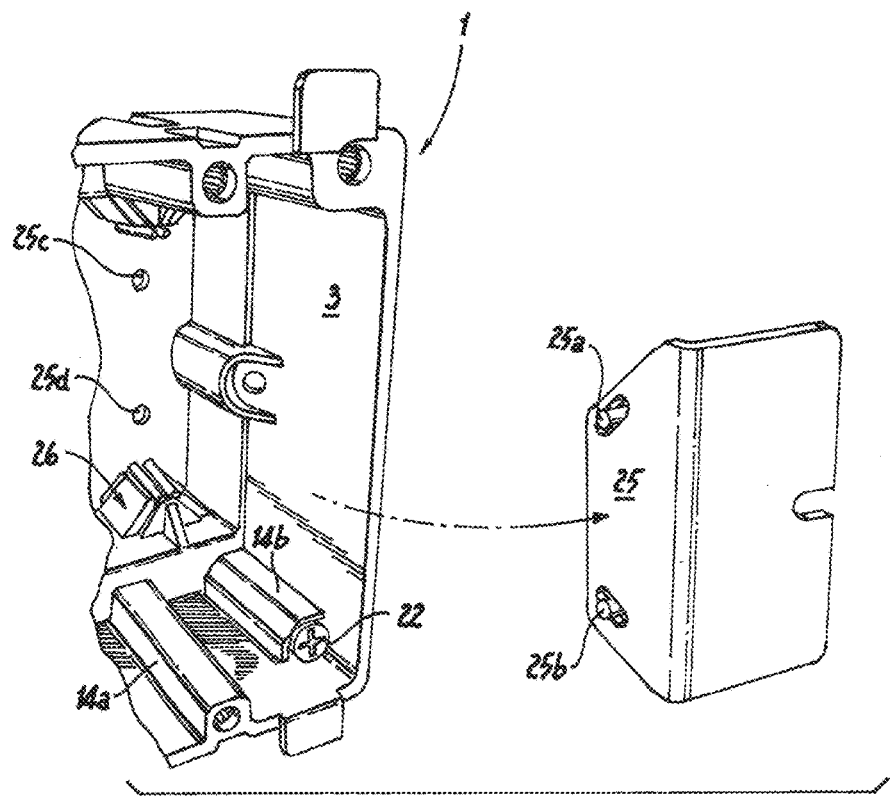
FIG. 3 is a local front perspective view of a double two-gang outlet box showing the removal of a leveling wedge component, for adding to a portion wall of the box, so that a top to bottom or side to side flat wall is provided.

FIG. 3 shows a close up portion compartment of the 2-gang electric outlet of a new work/old work box 1 showing the removal of a leveling wedge component 20 which is used for stabilizing one exterior side wall 2 or 3 to rear protrusion compartment 8 of the new work/old work box 1 where the new work/old work box 1 is used in a new work exposed stud environment and is to be attached to an exposed stud S. Normally there would be a gap between the side wall 2 or 3 and the side wall 8a of the rear protrusion compartment 8 because of a setback that the sidewall 8a is away from the sidewall 2 or 3 of the new work/old workbox 1. Therefore leveling wedge component 20 is inserted against wall 8a of the rear protrusion compartment 8 so that the outside of the leveling wedge component 20 is flush, and in positional register, with the exterior of the adjacent sidewall 2 or 3. The leveling wedge component 20 has protruding tabs 20a and 20b which connect with corresponding receptacles 20c and 20d of the electrical new work/old work box 1.

Figure 4:
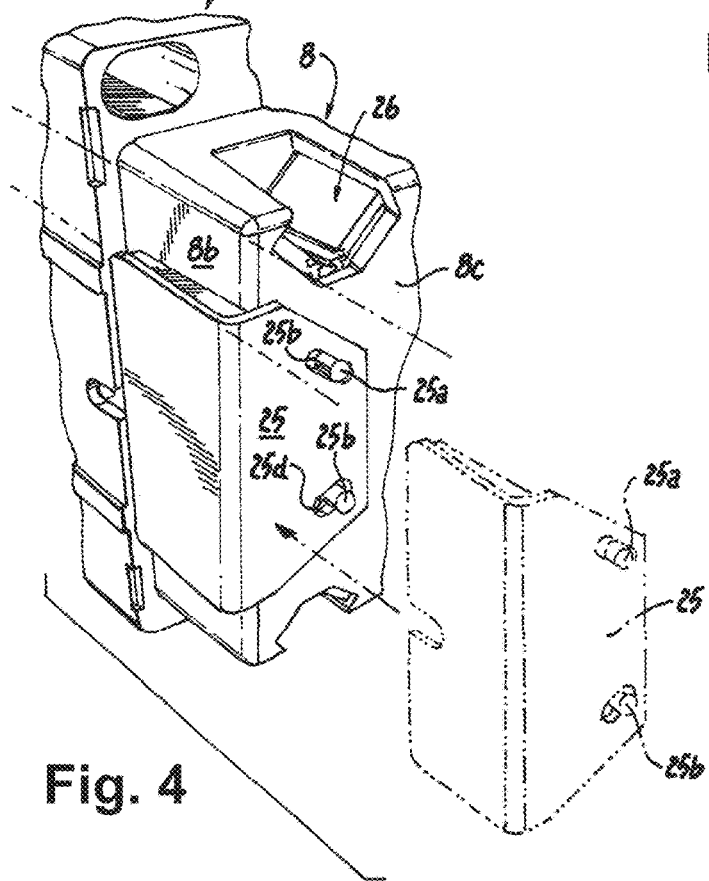
FIG. 4 is a local rear perspective view of the box of FIG. 3, showing the attachment of the leveling wedge component to the rear wall of the box, to make the adjacent side wall flush with an adjacent wall stud.

FIG. 4 shows the box of FIG. 3, showing the attachment of the leveling wedge component 20 to the rear protrusion compartment 8 extending from the rear wall 6 of the new work/old work box 1.

FIG. 5 shows the electrical new work/old work box 1 with the extendable, slidable finger tab 19 for holding the box 1 during installation in a cut-out hole 15 in a SHEET ROCK® wall panel WP, such as in at the view arrow 5 of FIG. 1, showing the approach of a user's thumb to a non-deployed extendable, slidable finger tab 19. Note that finger tab 19 includes a graspable aperture 19a for the installer to insert his or her finger therethrough for grasping the finger tab 19 between the finger and thumb of the installer. Optionally the slidable finger tab 19 can also have a small slit 19b into which the user's fingernail or a flat head screwdriver can be inserted, to extend the slidable finger tab 19 outward for use as a finger pull handle to grasp the work box 1.

FIG. 6 shows the extendable, slidable finger pull handle tab 19 like in FIG. 5, but shows the user's fingers extending and pulling the finger pull handle tab 19 outward so that the user's finger can be inserted therein and thereby hold the new work/old work box 1 in place, during installation within a cutout hole 15 in a SHEET ROCK® wall panel WP or to an exposed wooden stud S, adjacent to the cutout hole 15 of the SHEET ROCK® wall panel WP.

Figure 7:
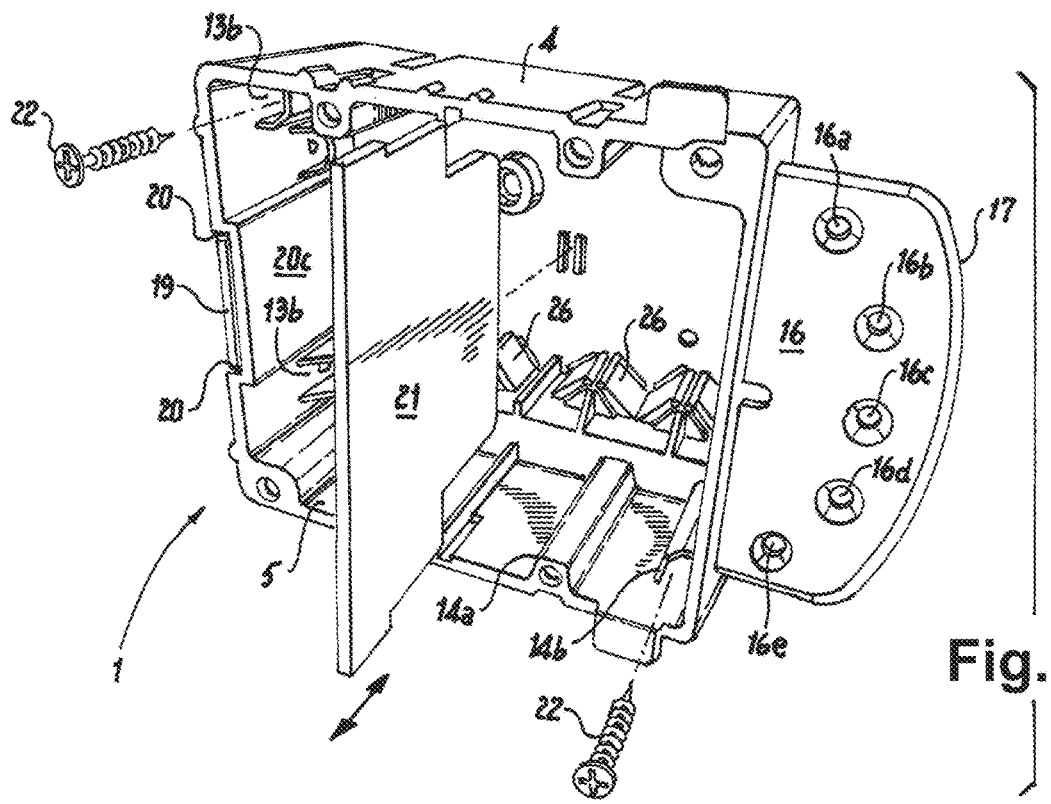
FIG. 7 is a front perspective view of the two-gang box of FIG. 2, showing the addition of an optional central partition for separating the two interior gang portions into high voltage and low voltage compartments, and the removal of mounting screws from storage pockets.

FIG. 7 shows the box of FIG. 1, but where the new work/old work box 1 is shown with the addition of an optional central partition 21 to separate a standard conventional high voltage wiring portion 21a from a low voltage wiring portion 21b. FIG. 7 also shows fastener screws 22 and the removal of mounting screws 22a from storage pockets 23 within the opening 7 of the new work/old work box 1 or 1a, depending on whether the box 1 or 1a is being used for old or new work respectively. FIG. 7 also shows the curved edged nail tab 16 adjacent to side wall 3 of electrical new work/old workbox 1.

Figure 8:
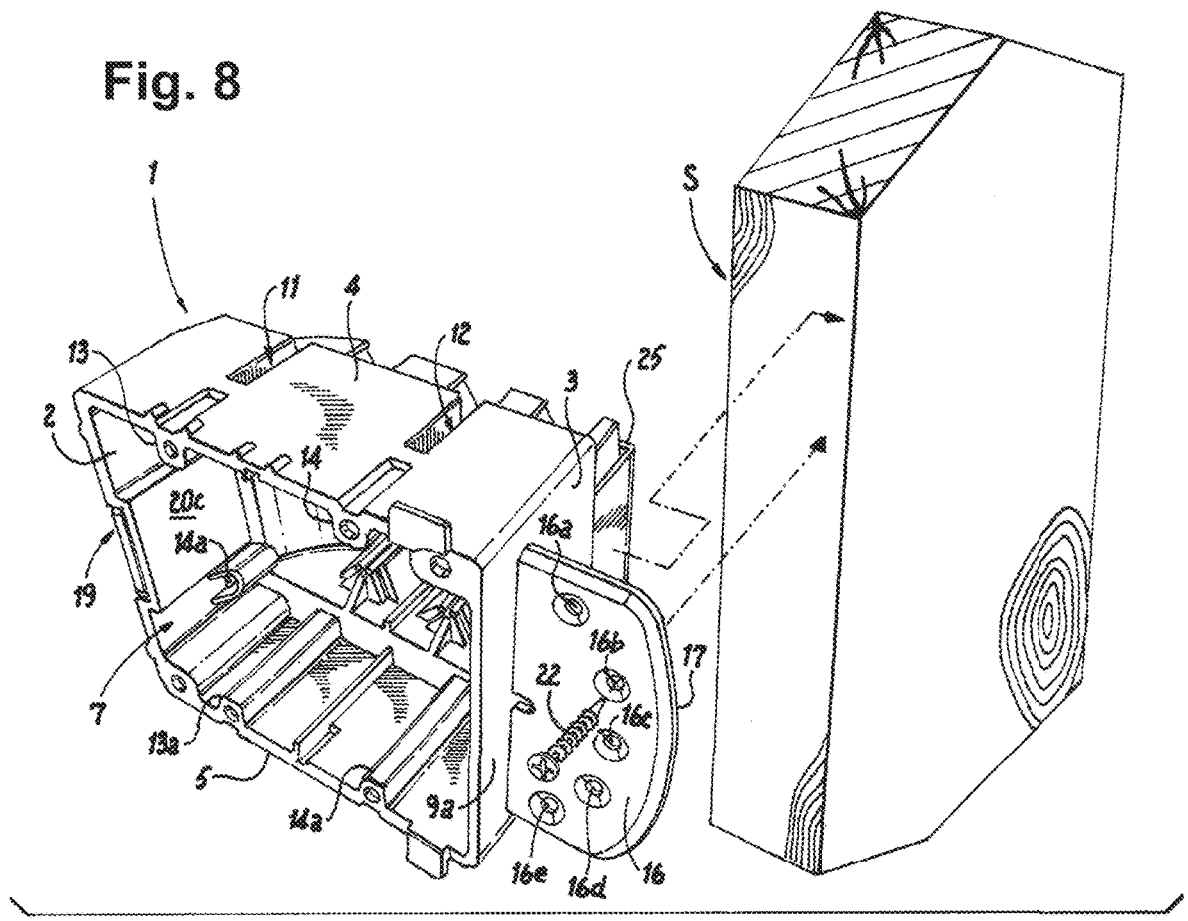
FIG. 8 is a perspective view of the two-gang new box of FIG. 1 showing an initial mounting of a nail tab to a stud in a new work box construction environment, where the nails or screws engage the wall stud.

FIG. 8 shows the new work/old work box 1 of FIGS. 1 to 4 having an initial mounting to a stud S in a new construction environment, where the nail or screw goes through nail/screw hole 16b in the curved edged nail tab 16 into the stud S.

Figure 9:
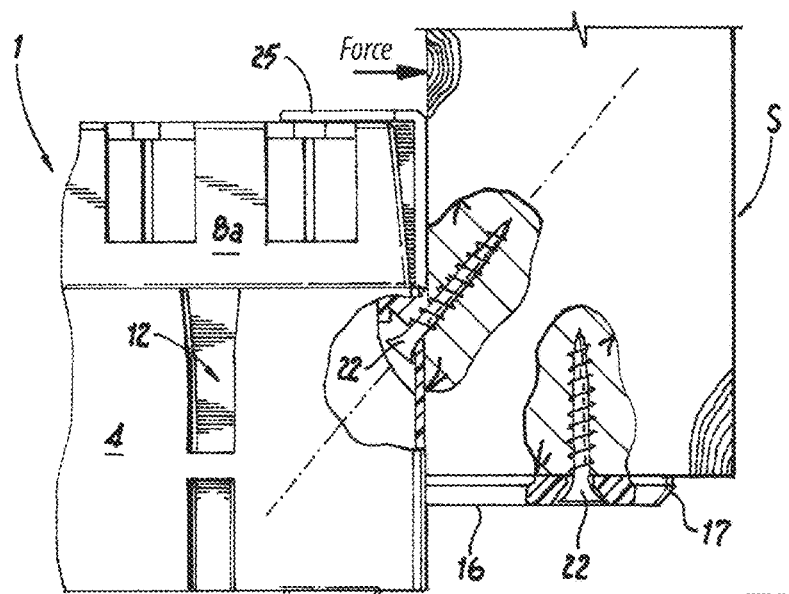
FIG. 9 is a top plan view of the two-gang new work box of FIG. 8 mounted to a stud, wherein the leveling wedge stabilizes the box with a combined flush wall against the stud while a second screw is installed into the stud at an angle.

FIG. 9 shows the top of the new work/old work box 1 of FIG. 8 mounted to a stud S, wherein the leveling wedge component 20 is inserted and used to stabilize the new work/old work box 1 against the stud S while a second screw is installed into the stud S at an angle.

FIG. 10 shows the new work/old work box 1 of FIG. 9 being introduced into a cutout hole 15 in the SHEET ROCK® wall panel WP, where the extended slidable finger tab 19 allows the user to maintain a grip on the new work box/old work box 1.

FIG. 11 shows the new work/old work box 1 of FIG. 10, wherein the curved radiused corner 18 (or mitered corner, as shown) of the new work/old work box 1 allows for ease of installation into the SHEET ROCK® cutout hole 15, because the curved radius corner 18, or mitered corner 18, allows the new work/old work box 1 to smoothly slip into place without squared off walls interfering with the sliding of the corner 18 of the new work/old work box 1 into place in the cutout hole 15 of the SHEET ROCK® wall panel WP. For old work installations, one or more tabs 28 extend up from any outer edges of the work box 1 to help hold the work box 1 in place within a cut-out hole in a SHEET ROCK® wall panel WP.

FIGS. 10 and 11 also show new work/old work box 1 provided the addition of an optional central partition 21 of FIG. 7, to separate the standard conventional high voltage wiring portion 21a from the low voltage wiring portion 21b.

Figure 12:
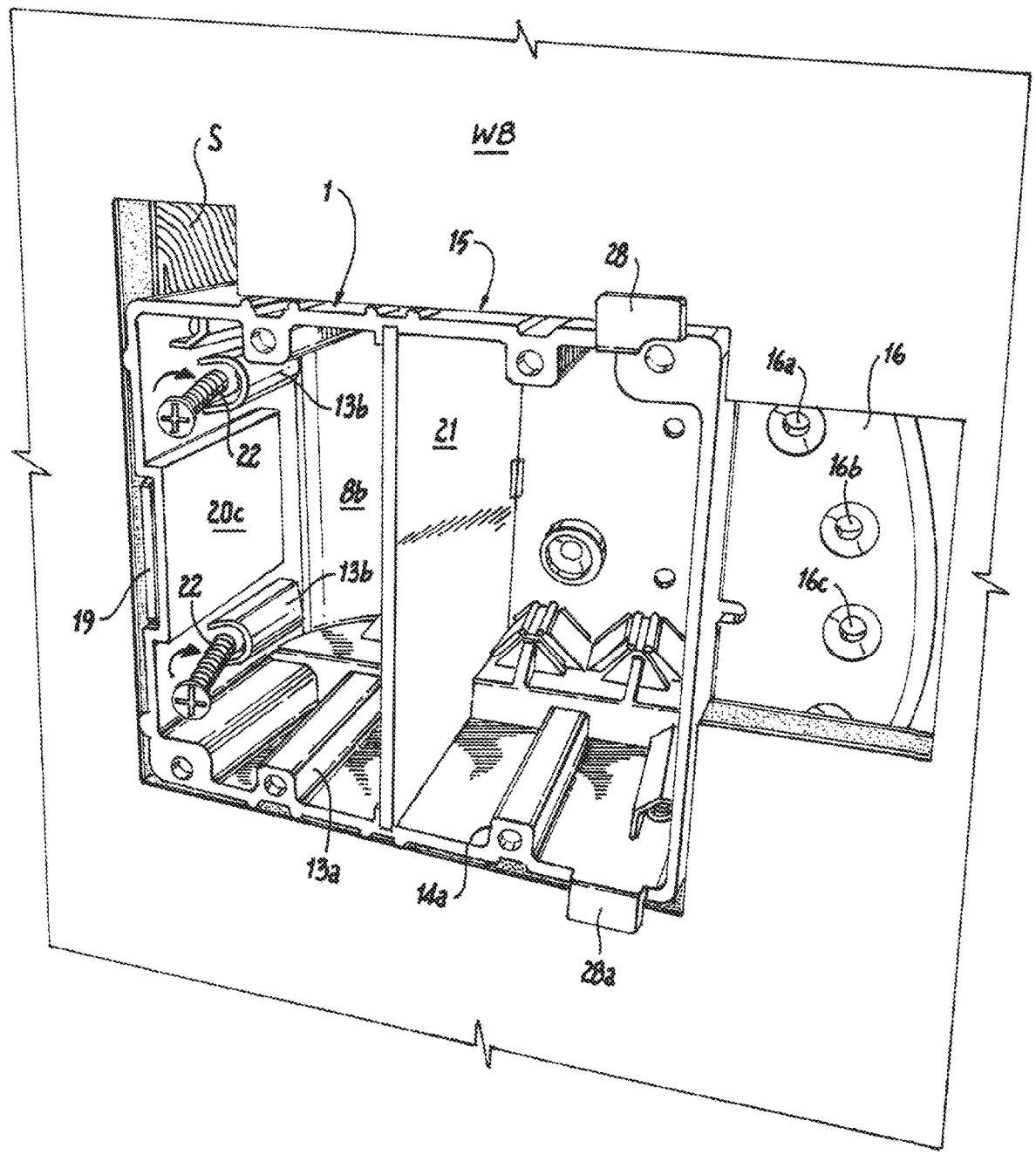
FIG. 12 is a perspective view of the box of FIG. 11 shown seated within the wall panel cut-out and showing the large nail tab still intact behind the SHEET ROCK® wall panel.

FIG. 12 shows the new work/old work box 1 of FIG. 11, but placed within a cutout hole 15 within the SHEET ROCK® wall panel WP with the optional central partition 21 of FIG. 7, separating the standard conventional high voltage wiring portion 21a from the low voltage wiring portion 21b seated within the cutout hole 15 of the SHEET ROCK® wall panel WP, while showing the large nail tab 16 still intact behind the SHEET ROCK® wall panel.

Figure 13:
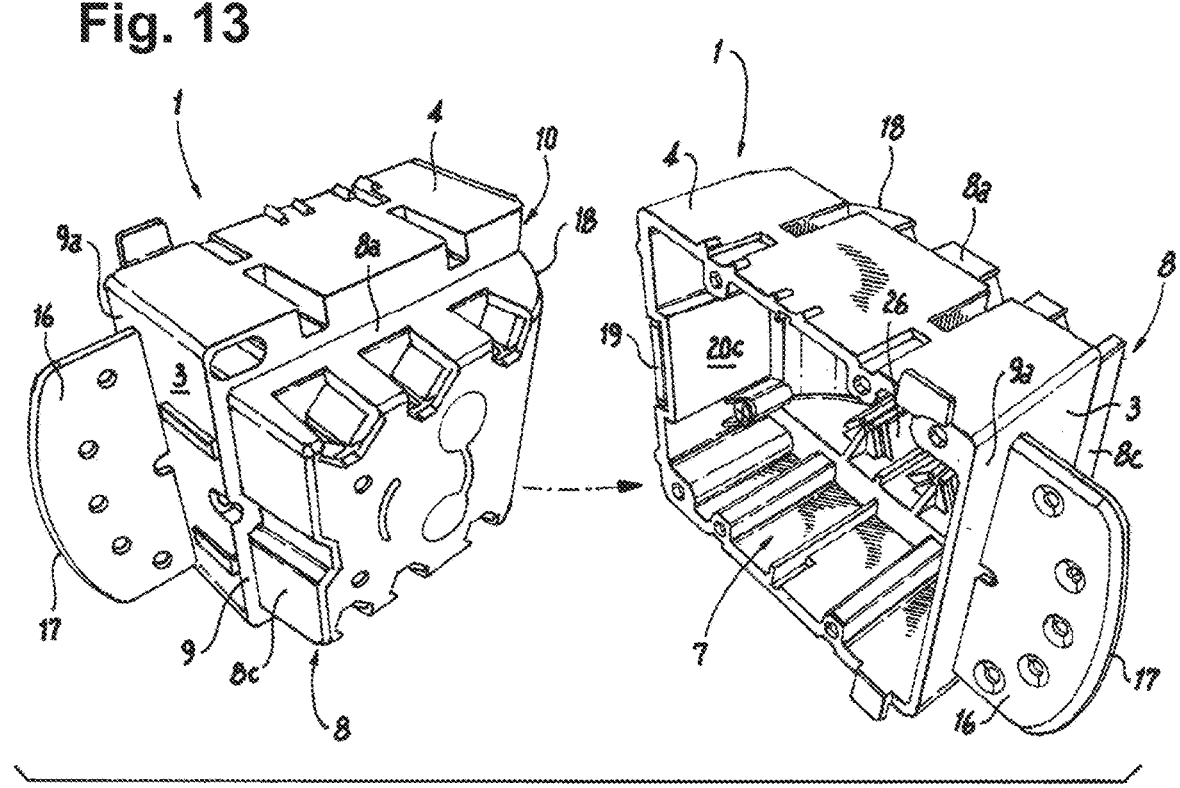
FIG. 13 is a perspective view of two double two-gang new work/old work boxes in preparation for nesting.
Figure 14:
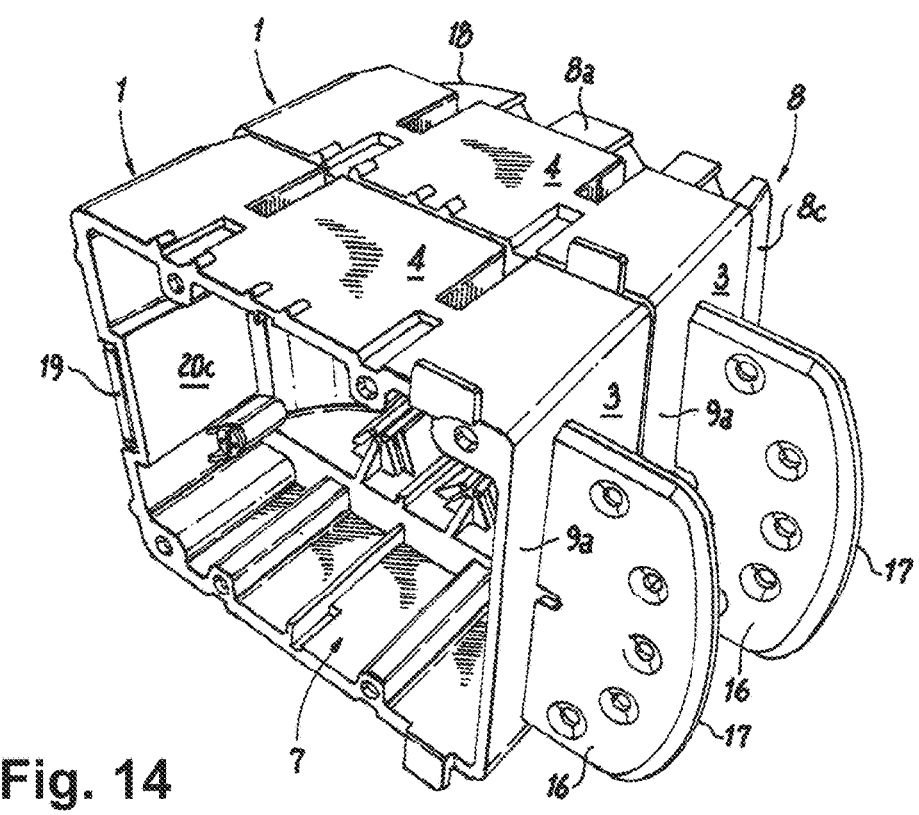
FIG. 14 is a perspective view of the two-gang new work/old work boxes of FIG. 13 in a nested stacked condition.

FIG. 13 shows two double 2-gang boxes 1 and 1 being rotated in the direction of the curved arrow A from a position 90 degrees apart from each other until they are nested together as shown in FIG. 14.

Figure 15:
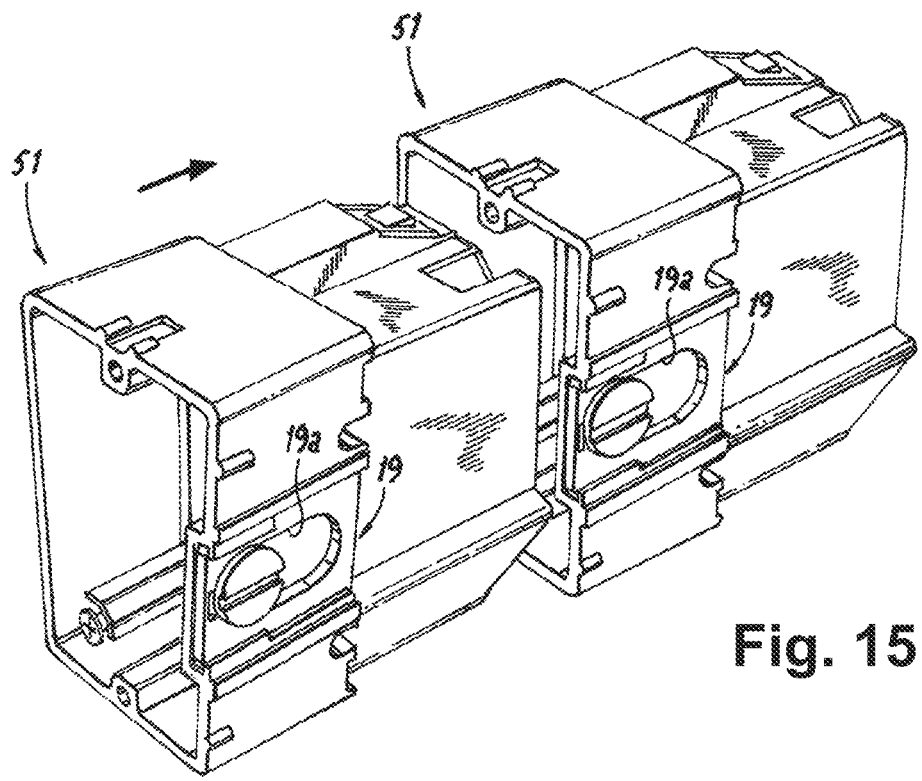
FIG. 15 is a perspective view of two single one-gang boxes in preparation for nesting.
Figure 16:
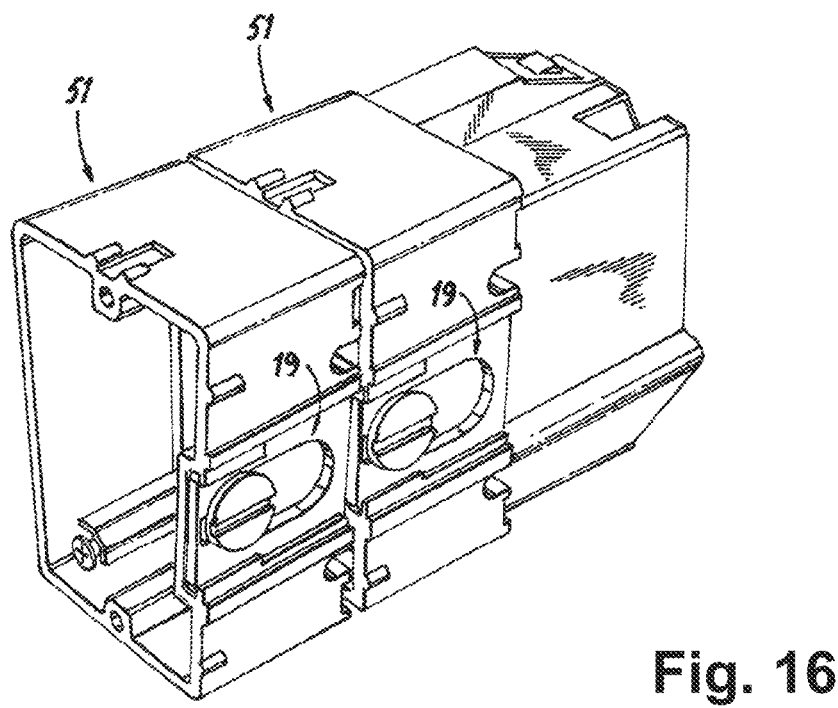
FIG. 16 is a perspective view of the one-gang boxes of FIG. 15 in a nested stacked condition.

FIG. 15 shows two single 1-gang boxes 51 being axially aligned apart from each other until they are nested together as shown in FIG. 16.

Figure 17:
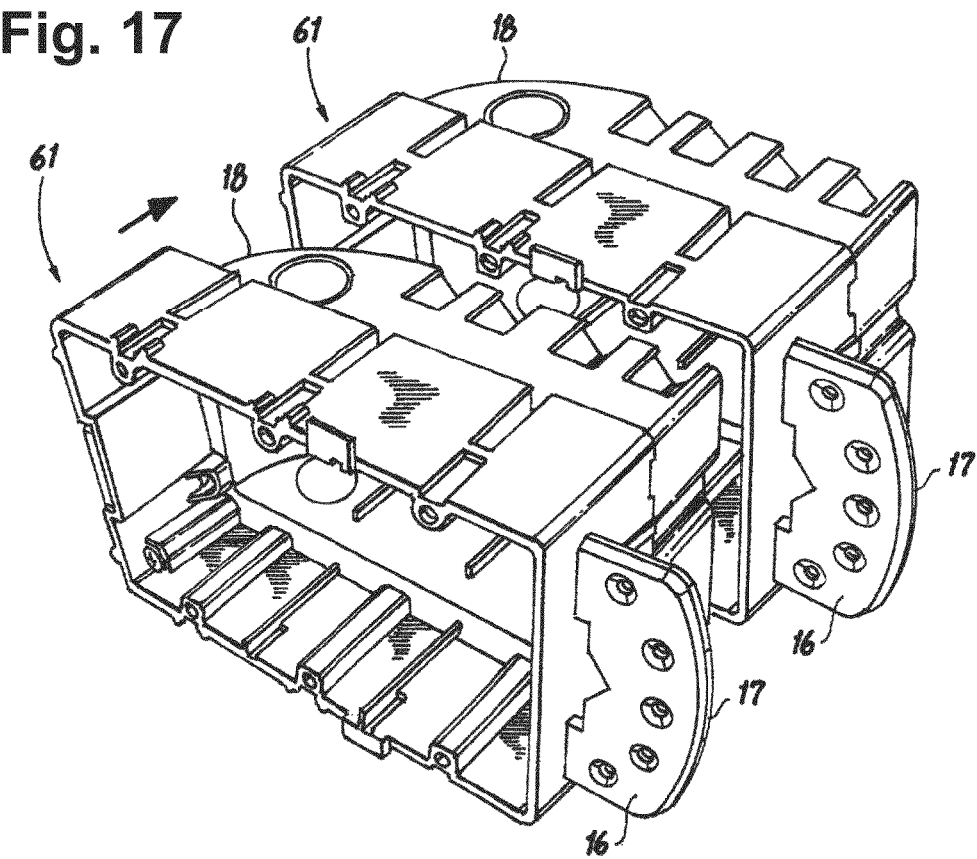
FIG. 17 is a perspective view of two triple three-gang new work/old work boxes in preparation for nesting.
Figure 18:
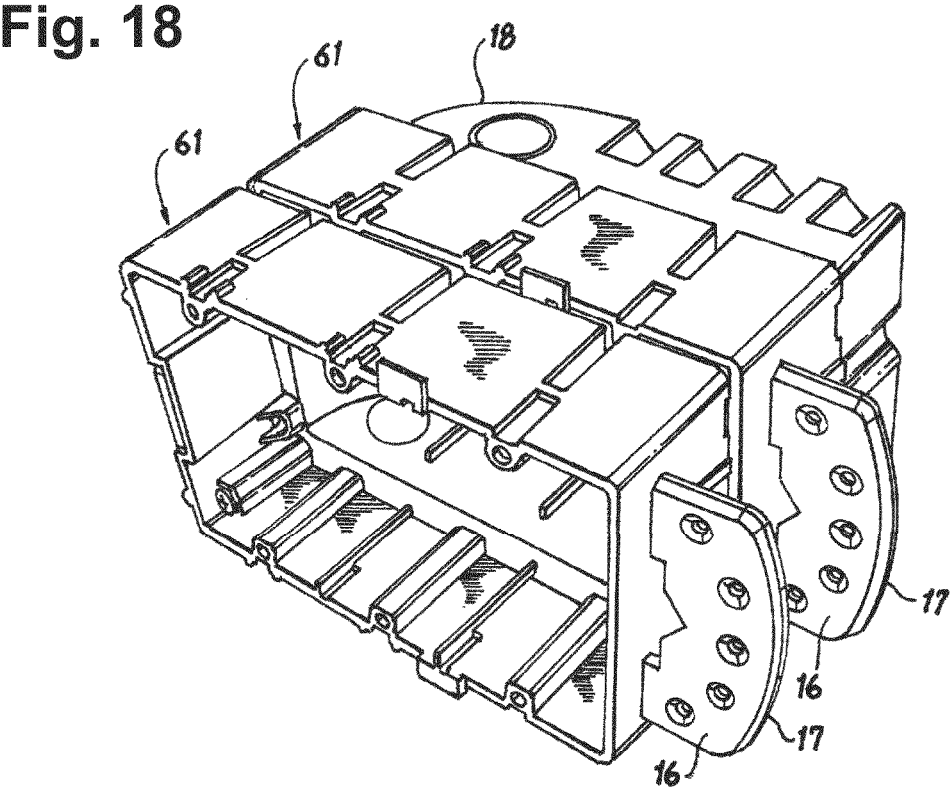
FIG. 18 is a perspective view of the three-gang new work/old work boxes of FIG. 17 in a nested stacked condition.

FIG. 17 shows two triple 3-gang boxes 61 being axially aligned apart from each other until they are nested together as shown in FIG. 18.

Figure 19:
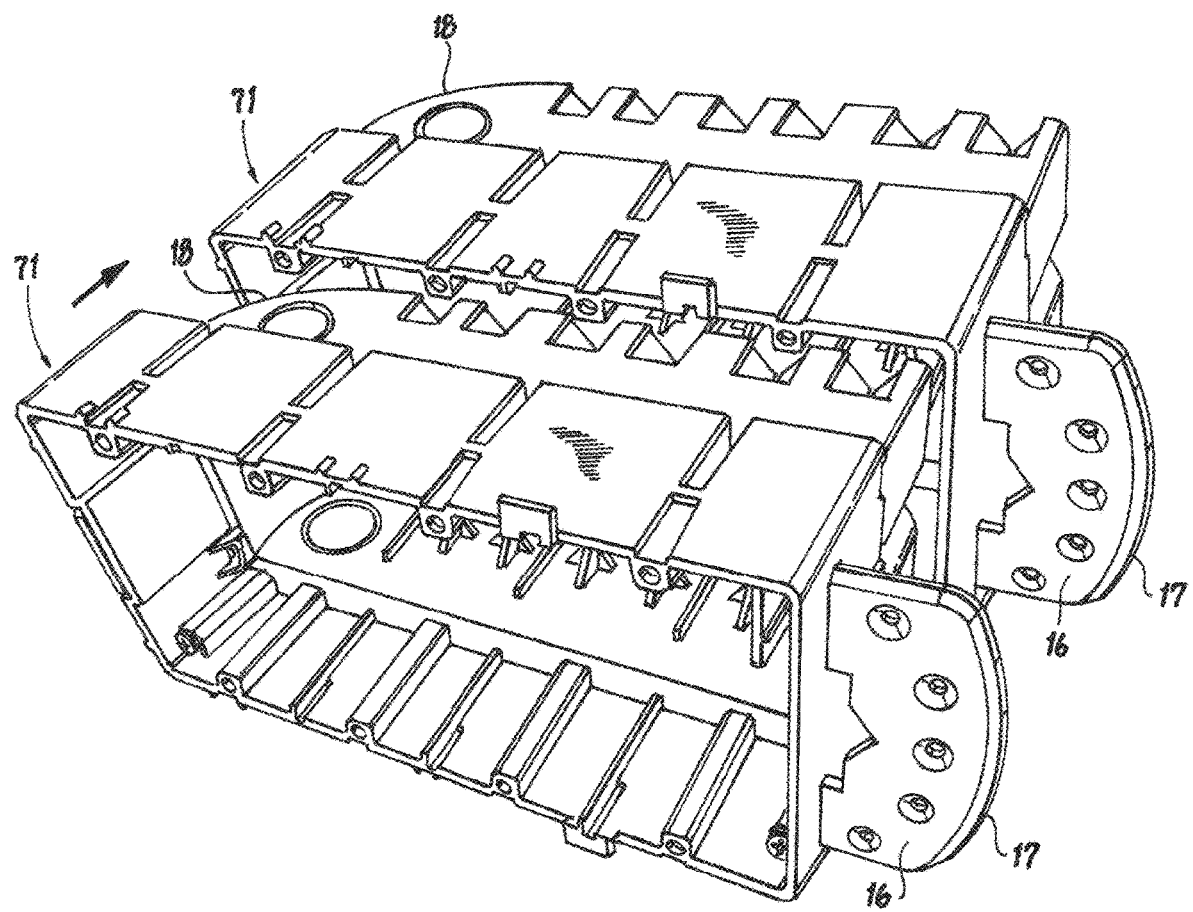
FIG. 19 is a perspective view of two quadruple four-gang new work/old work boxes in preparation for nesting
Figure 20:
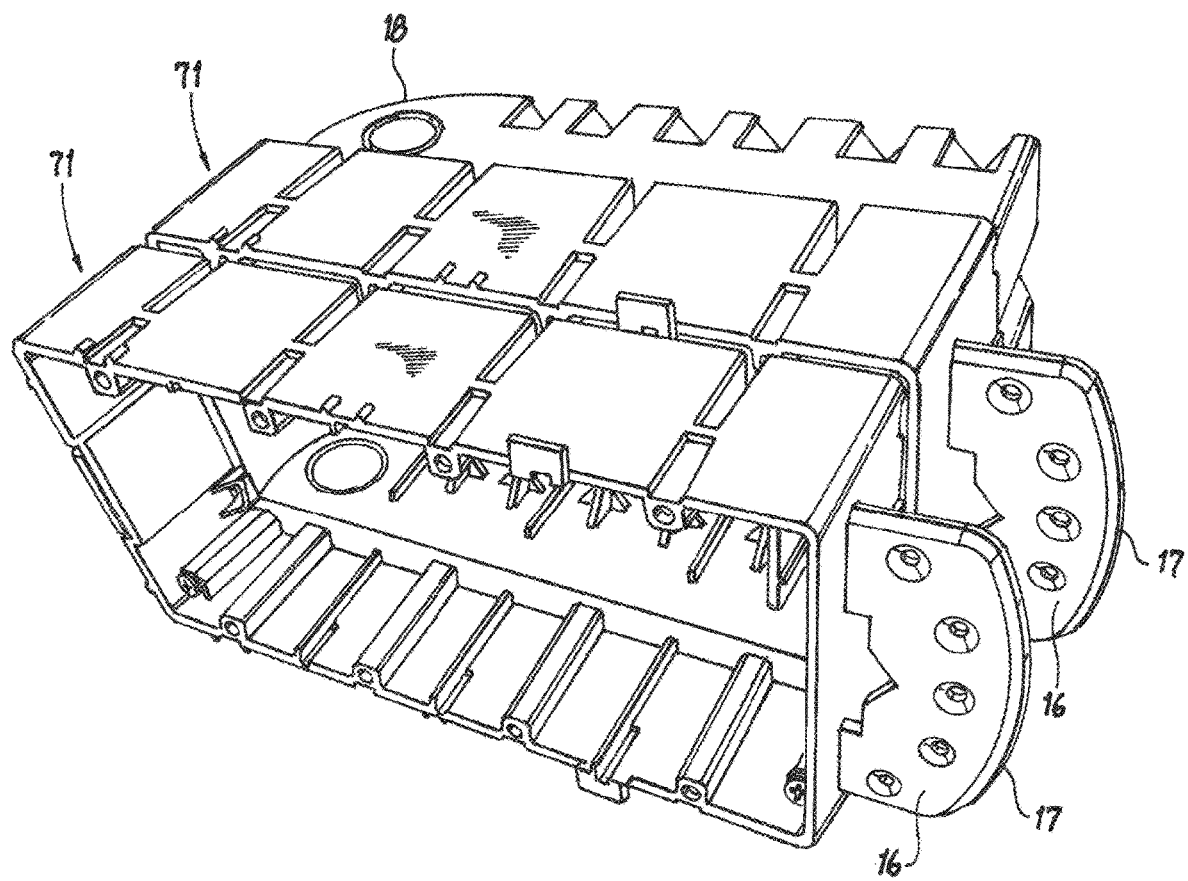
FIG. 20 is a perspective view of the four-gang new work/old work boxes of FIG. 19 in a nested stacked condition.

FIG. 19 shows two quadruple 4-gang boxes 71 being axially aligned apart from each other until they are nested together as shown in FIG. 20.

Figure 21:
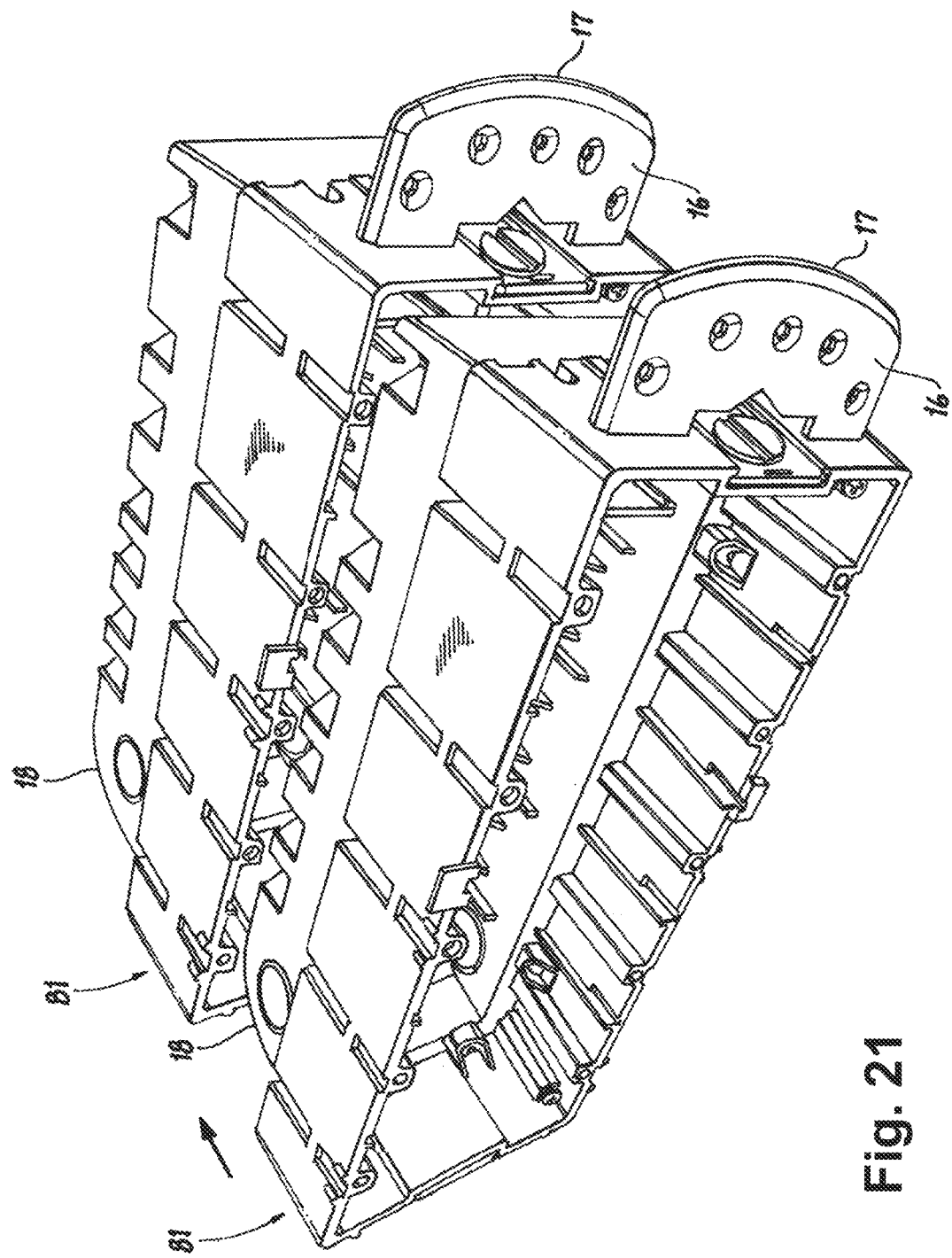
FIG. 21 is a perspective view of two quintuple five-gang new work/old work boxes in preparation for nesting.
Figure 22:
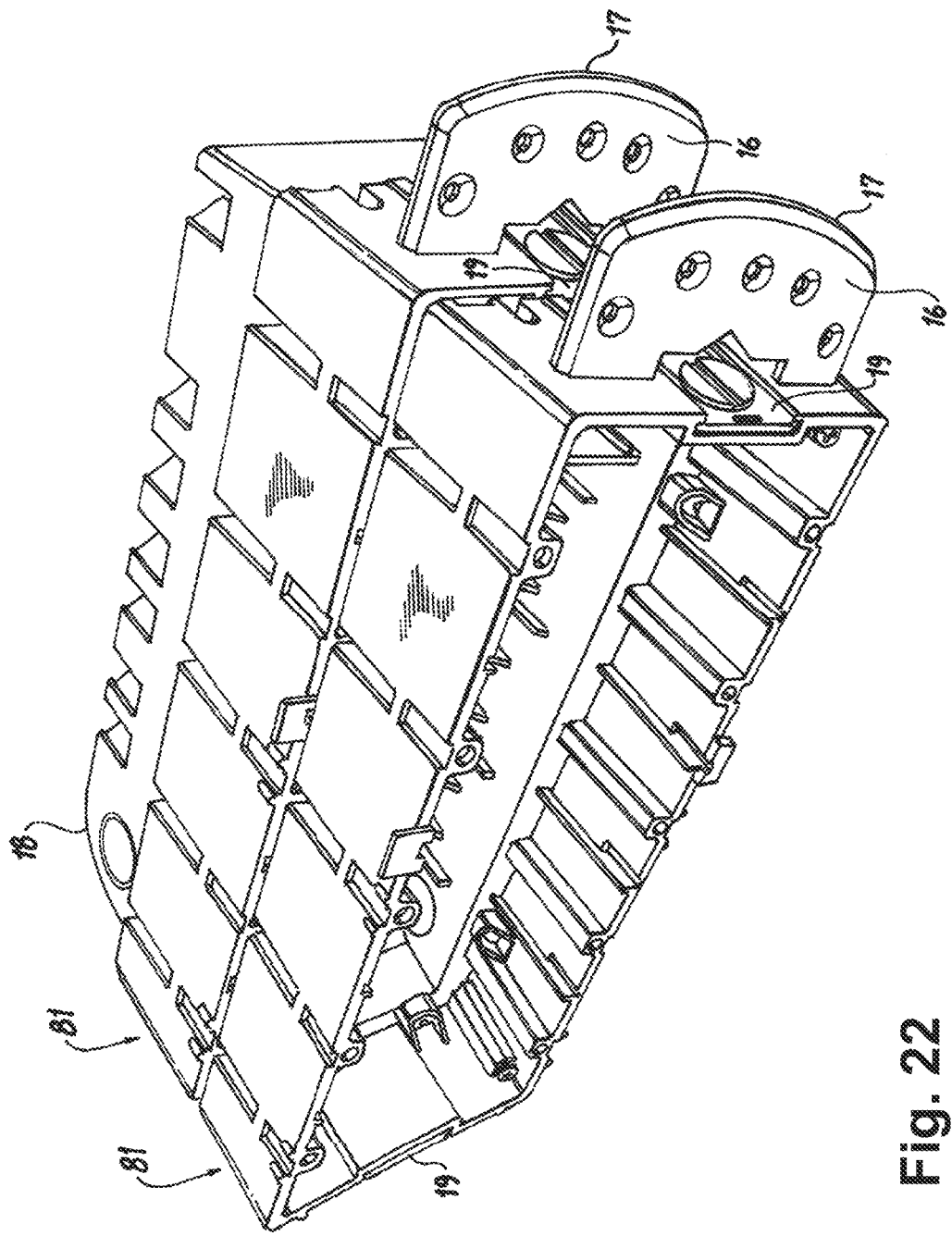
FIG. 22 is a perspective view of the five-gang new work/old work boxes of FIG. 21 in a nested stacked condition.

FIG. 21 shows two quintuple 5-gang boxes 81 being axially aligned apart from each other until they are nested together as shown in FIG. 22.

Figure 23:
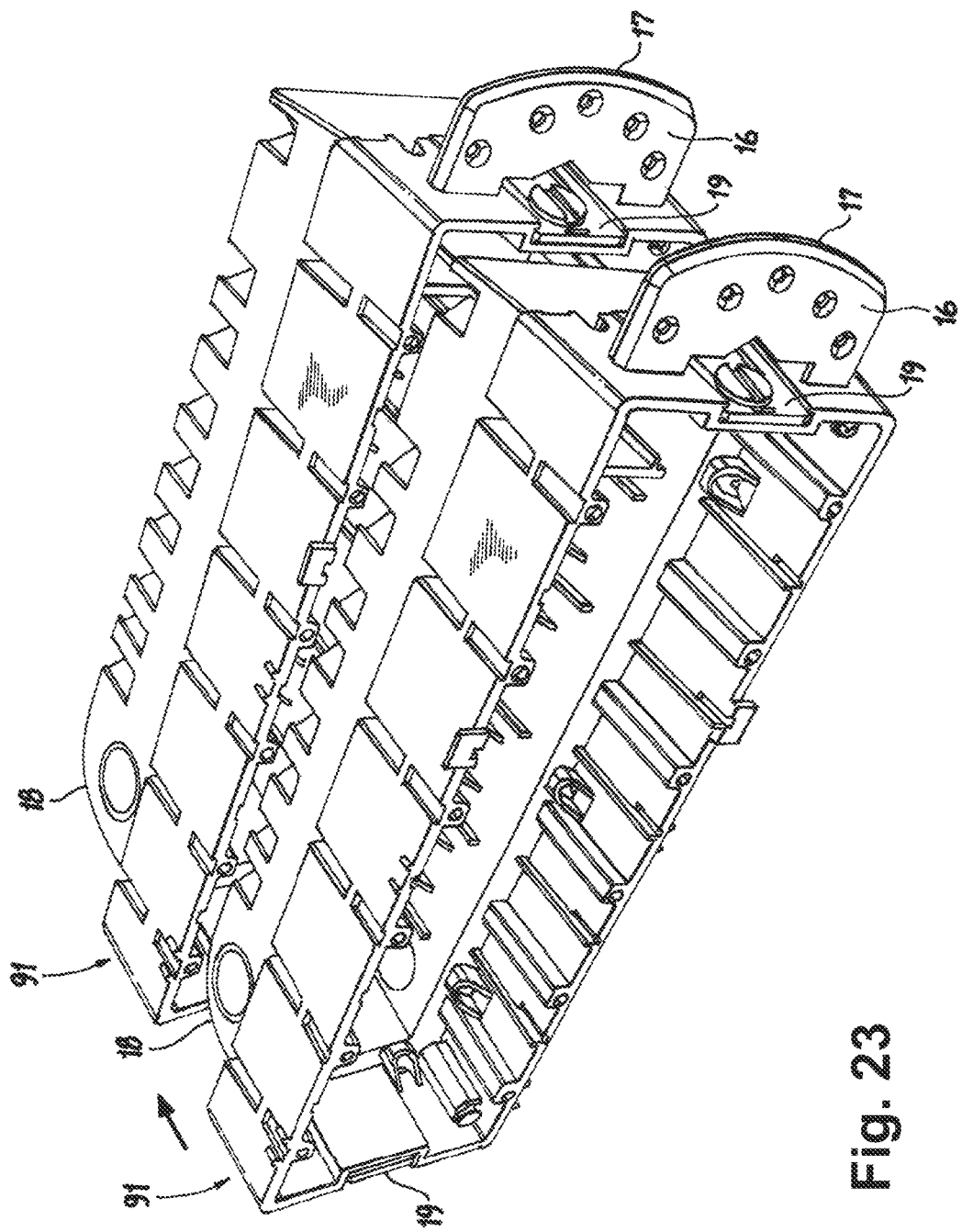
FIG. 23 is a perspective view of two sextuple six-gang new work/old work boxes in preparation for nesting.
Figure 24:
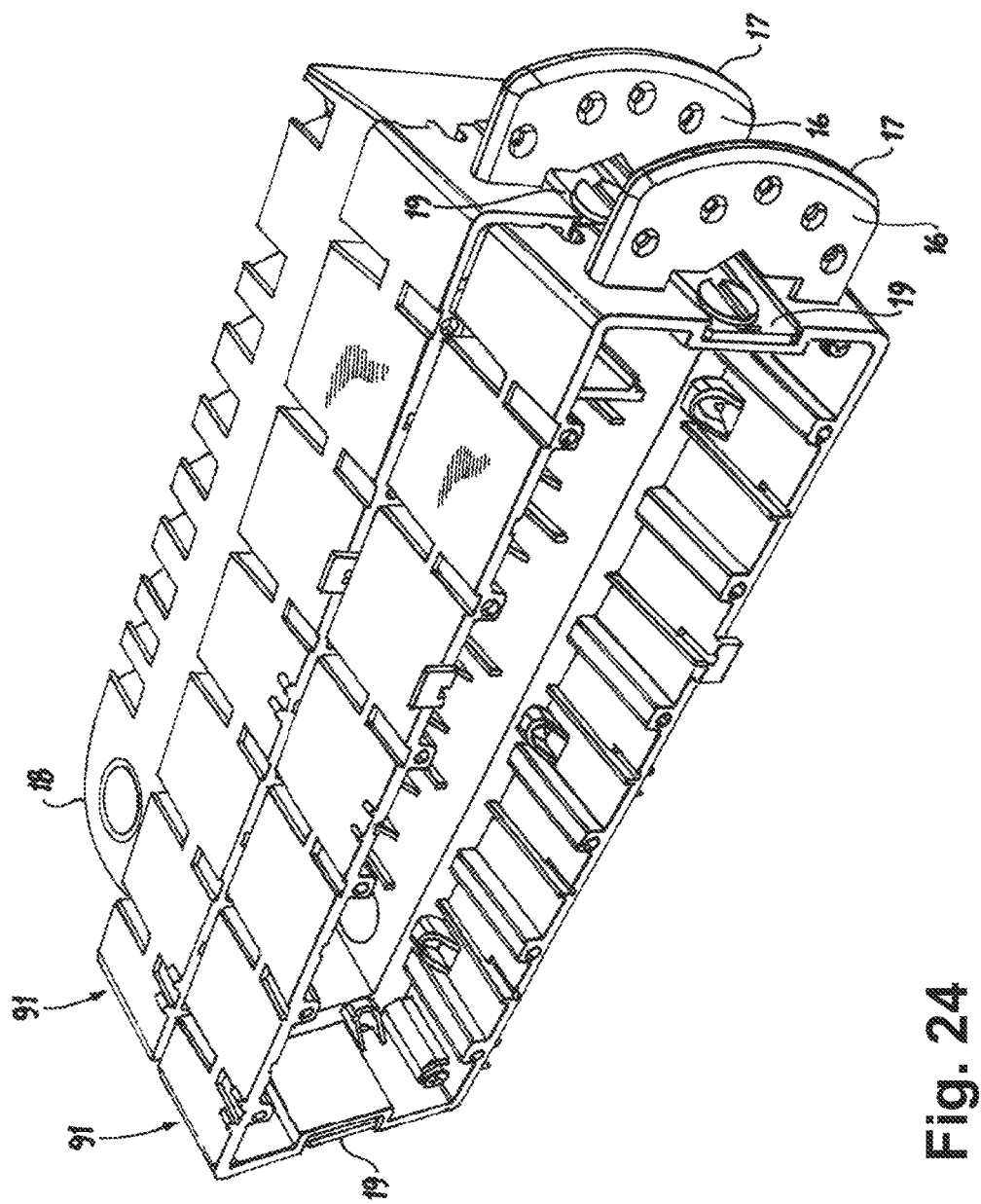
FIG. 24 is a perspective view of the six-gang new work/old work boxes of FIG. 23 in a nested stacked condition.

FIG. 23 shows two sextuple 6-gang boxes 91 being axially aligned apart from each other until they are nested together as shown in FIG. 24.

Figure 25:
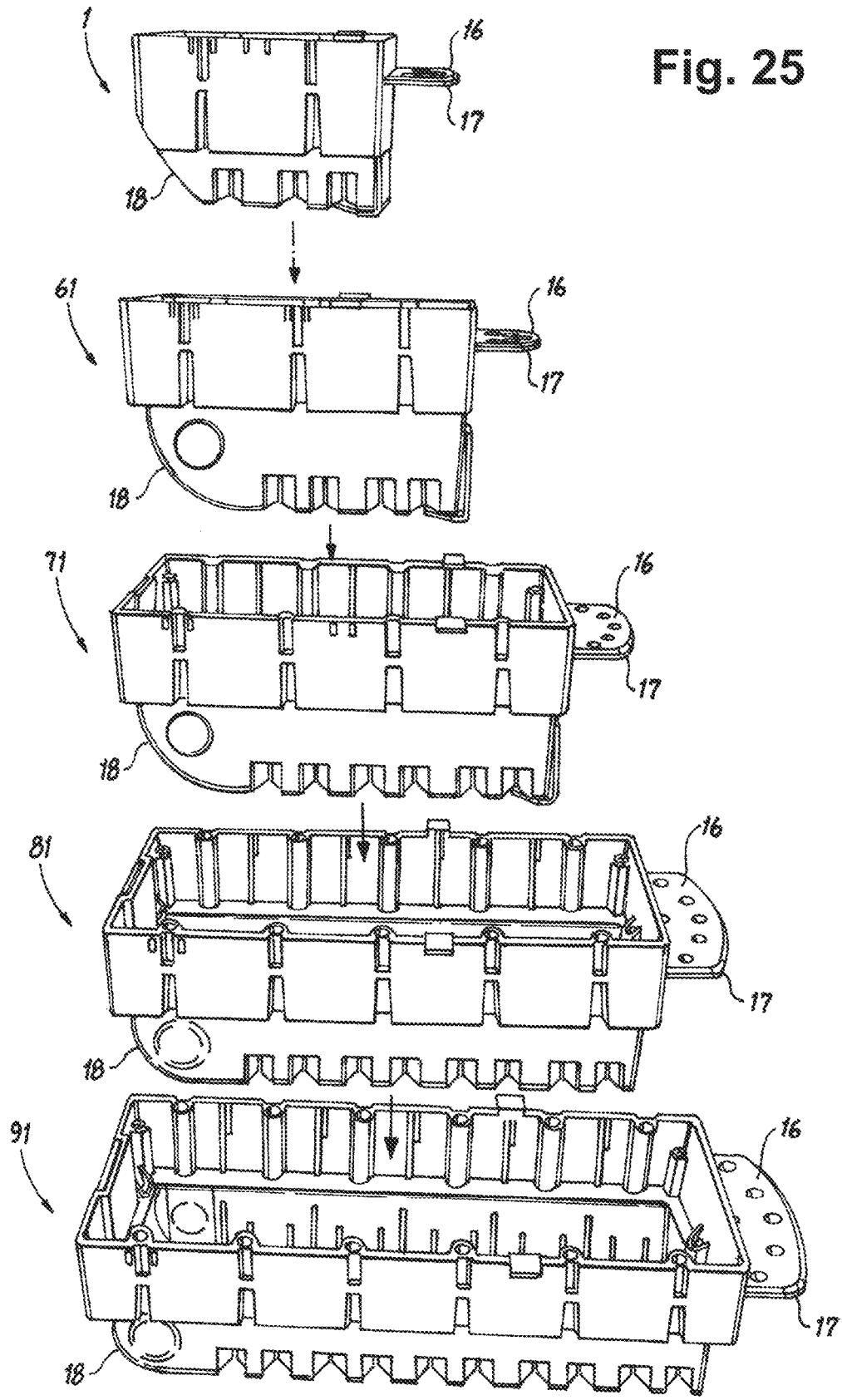
FIG. 25 is an exploded perspective view of the double, trip, quadruple, quintuple, and sextuple boxes in preparation for nesting.
Figure 26:
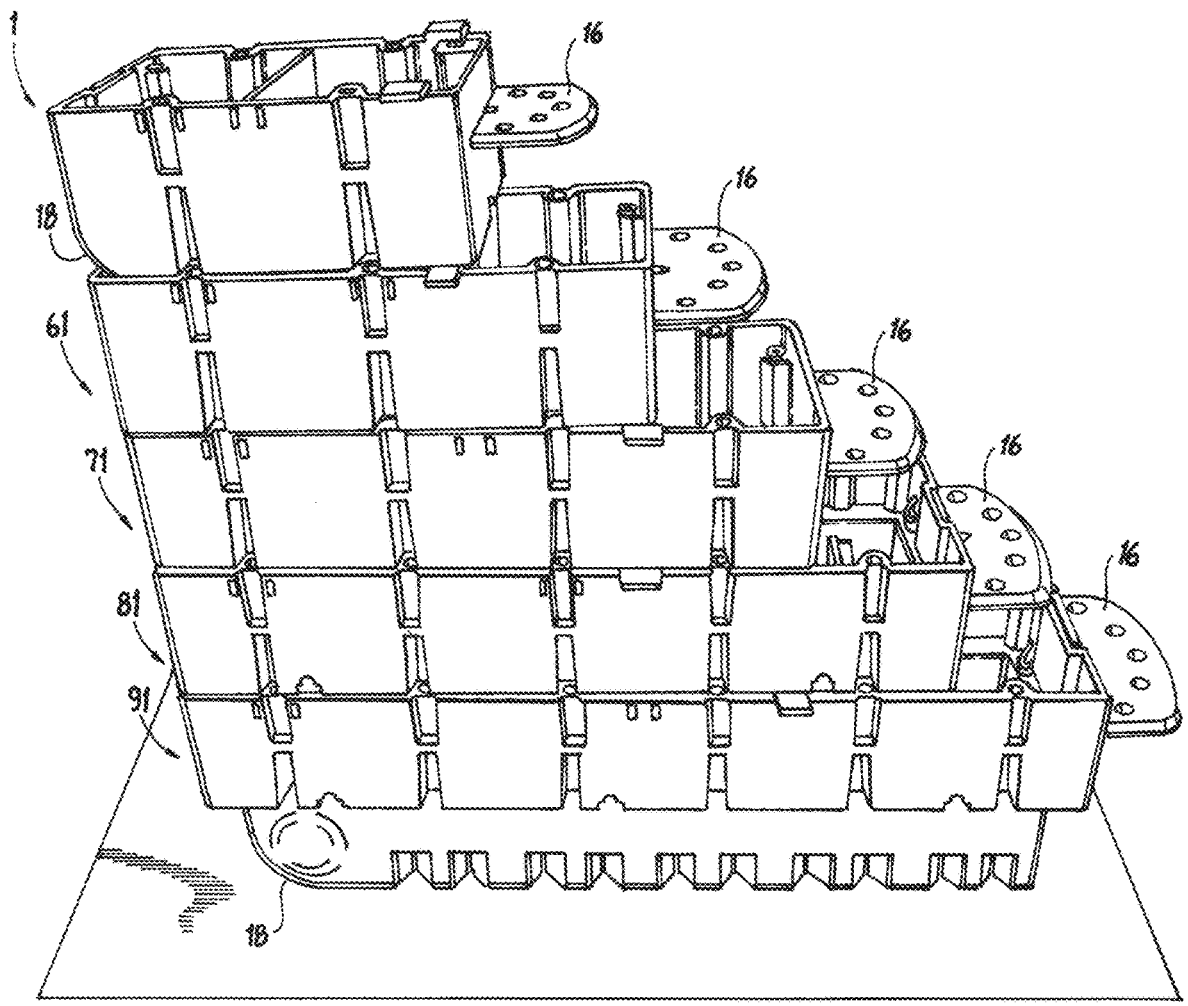
FIG. 26 is a perspective view of the boxes of FIG. 25 in a nested stacked condition.

FIG. 25 shows an exploded perspective view of the double 2-gang box 1, triple 3-gang box 61, quadruple 4-gang box 71, quintuple 5-gang box 81, and sextuple 6-gang box 91 in preparation for nesting in a stackable position have an L-shaped profile when nested together, as in FIG. 26, which shows a nested side perspective view of the boxes of FIG. 25 in a nested condition.

Figure 27:
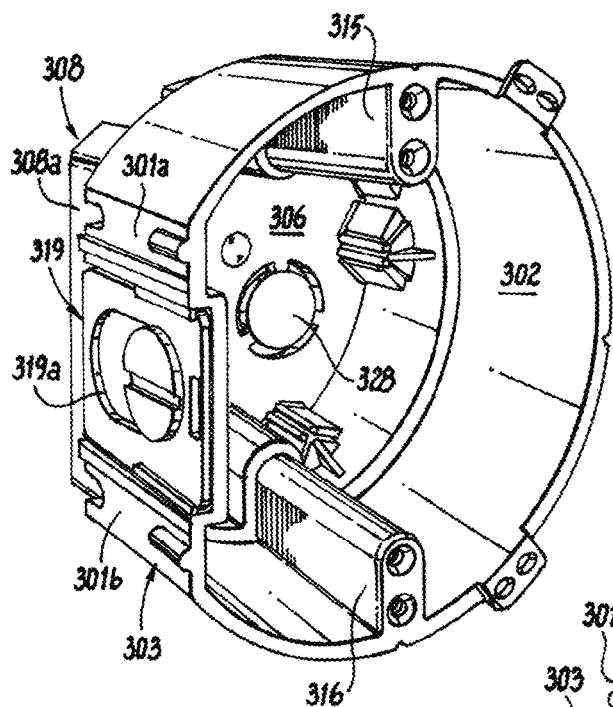
FIG. 27 is a perspective front view of an alternate round outlet box, showing a slidable finger holding tab.
Figure 28:
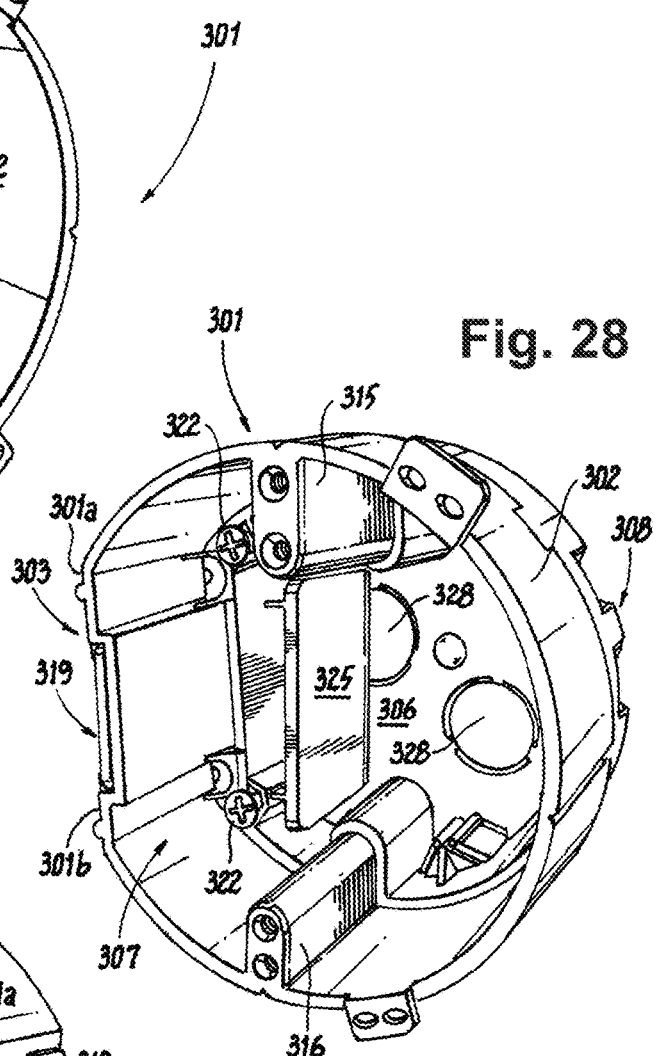
FIG. 28 is a second perspective front view of the round box of FIG. 27, with a wedge component.
Figure 29:
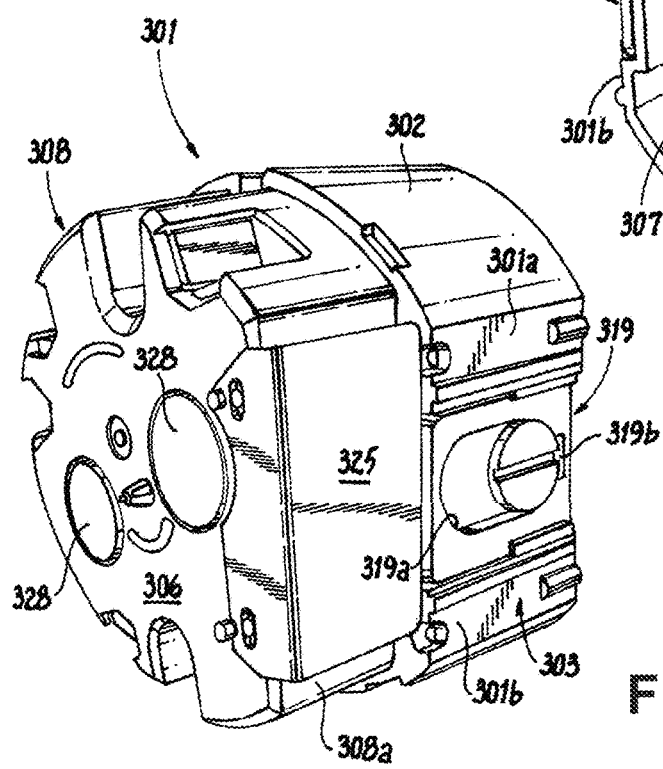
FIG. 29 is a perspective of the rear portion of the round box of FIG. 27, with a wedge component, showing the slidable finger holding tab.

FIG. 27 shows an open front of an alternate round outlet box 301. FIG. 28 shows another front of the round box 301 of FIG. 27. FIG. 29 shows the rear portion of the round box 301 of FIG. 27

FIGS. 27, 28 and 29 show the round electrical work box 301 including a partially extending circumferential round wall 302 having a planar wall 303 extending and connecting opposite arc surfaces 301a and 301b of the partially extending circumferential round wall 302. The partially extending circumferential round wall 302 has a front opening 307 and a rear closed wall 306. The rear closed wall 306 of the round electrical box 301 is adaptable to extend into an opening in a SHEET ROCK® wall panel WP or into a horizontal ceiling wall (not shown). The round electrical work box 301 is secured in place by one or more fasteners 322 singularly or in combination, which are selected from the group consisting of;

a) one or more internal fasteners 322 insertable within internal fastener mounts 315 and 316 inside the round electrical box 301, which are attachable to the stud S within an upstanding side wall or a horizontal ceiling wall to which the round electrical box 301 is fastenable;

b) one or more external toggle fasteners (not shown) for mounting the round electrical work box 301 within a wall panel WP;

c) a plurality of spaced flanges 318 extending outwardly from the upper edge of the partially extending circumferential round wall 302, where the spaced flanges are adapted to be flush against an outer or inner surface of a SHEET ROCK® wall panel WP; or, d) combinations of "a", "b" and "c" together.

The round electrical work box 301 further includes a slidable pull handle tab 319 integrally and slidably attached to an outer surface of the planar wall 303 of the round electrical work box 301, where the slidable pull handle tab 319 is slidably movable outward between an extended position with a portion 319b having a finger insertable aperture hole 319a, thereof protruding outwardly from the front opening 307 of the round electrical work box 301 and in a retracted position completely flush against the outer surface of the planar wall 303 of the round electrical work box 301. The slidable pull handle tab 319 has the finger-graspable aperture 319a in the extended portion of the slidable pull handle tab 319 for the installer's finger grasping during positioning of the round electrical work box 301 in place.

The slidable finger pull handle tab 319 is adapted to allow the slidable pull handle tab 319 to be pushed into the retracted position after the round electrical work box 301 is fixed in place.

The stackable electrical round work box 301 further comprising a removable accessory leveling wedge 325 which provides a flat surface on the flat mounting surface 308a of the round box 301 for attachment to a wall stud S, such as a ceiling or wall panel. Reference numeral 308 designates the step-down outer round surface of the rear portion of the round box 301.

As shown in drawing FIGS. 1-29, all similar 2, 3, 4, 5 or 6-gang electrical work boxes can stack into each other by virtue of the square, rectangular or round circumferential edge step backs so that convex edges nest into concave receptacle regions of adjacent nested stackable electrical work boxes.

As noted before, in FIGS. 1 and 2, the opposite side wall 2 or 3 of the new work/old work box 1, located away from the side with the curved distal curved edged nail tab 16 (which is setback for SHEET ROCK® accommodation) is rounded with curved radius portion 18, so that the electrical new work/old work box 1 can pivot like a seesaw when being inserted into the new work/old work cut-out hole 15 in the SHEET ROCK® wall panel WP. In that way the electrical new work/old work box 1 can be inserted and come into the cut-out hole 315 at any angle to the cutout hole and the curved edge radius, or mitered portion, 18 enables ease of insertion, so that exact perpendicular placement is unnecessary, In conjunction with the slidable insertion of curved radius wall portion 18 of rearward protrusion compartment 8 of new work/old work box1, shown in FIGS. 7-12, smooth insertion is also facilitated by the curved edged nail tab 16 with its arcuate distal end being rounded, to also assist in pivoting into a new work/old work cutout hole 15 in a SHEET ROCK® wall panel WP. The curved edged nail tab 16 is also set back ½ inch so it will accommodate ½ inch sheet rock in the setback, whereby the curved edged nail tab 16 rests flush with the inside wall of the SHEET ROCK® wall panel WP, FIGS. 3 and 4 show the accessory leveling wedge 20 which provides a flush surface on the mounting wall of the work box 1, when the new work/old work box 1 is being aligned in place in the cut-out SHEET ROCK® wall panel WP hole 15 and therefore a flat surface is provided for mounting to a wall stud.

By virtue of the mirror image placement of the channel-holding blocks on the top and bottom inner walls of each respective new work/old work box 1, there is a corresponding adjacent area between the top shelf of the rear of the new work/old work box 1 and the top of the shoulder below and adjacent to the top shelf of the rear of the new work/old work box 1. Therefore, the geometry of the positive channel-holding blocks, being mirror images inside and outside of the lower stepdown shoulders of the work box enables adjacent stackable new work/old work boxes 1, 1 etc., to nest together in a stackable fashion.

As shown in FIGS. 1-2, 5-6, 10-13 15-16 and 27-29, the new work/old work box 1 (which may be used as either a new work box or a new work/old work box, being rectangular or square, having one more gangs associated therewith, or being a round box with a partial flat surface) optionally includes a slidable finger tab 19 that is provided between parallel tracks 20, 20a on a side 2 of the new work/old work box 1 to slide upwards at the user's convenience to hold the new work/old work box 1 while inserting the new work/old work box 1 into a hole 15 in a SHEET ROCK® wall panel WP. The slidable finger tab 19 with slot aperture 19a acts as a one finger operable pull handle, which extends outward to accommodate the installer's finger to hold the new work/old work box 1 and prevent it from falling inadvertently into the cut hole 15 of the SHEET ROCK® wall panel WP and thereby necessitating a large cutting of the wall panel WP to retrieve the fallen new work/old work box 1, which can be used either as a new work box with fastener nails mounted to a stud or as a new work/old work box held in place by the pivotable toggles. Optionally, the finger pull handle tab 19 can have a small linear slot 19b near its distal end so that the installer can optionally insert the installer's finger nail or a flat head screwdriver into the distal linear slot 19b for extending the finger pull handle tab 19 outward from the work box 1, to hold the work box 1 by the installer's finger and avoid dropping the work box 1 below and behind the SHEET ROCK® wall panel WP.

Slidable Finger Pull Handle Tab for Conventional Non-Stackable Electrical Work Boxes It is noted that the aforementioned slidable pull handle tabs 19 or 319 can be applied to non-stackable new work/old work boxes, whether rectangular/square or round.

For example, in an optional embodiment, the rectangular or square electrical new work/old work box may be non-stackable (not shown) and include the following:

1) a plurality of planar walls including a top wall, two side walls, a rear wall and a bottom wall forming an open end surrounded by upper edges of said walls;
2) a bottom portion of said electrical box adapted to extend into an opening in a wall board;
3) at least one fastener singularly or in combination selected from the group consisting of;
   a) one or more internal fasteners with mounts inside said electrical box, said fasteners attachable to a stud within the wall to which the electrical box is fastenable;
   b) one or more external toggle fasteners for mounting the electrical work box within a wall panel;
   c) a plurality of spaced flanges extending outwardly from said upper edges of said side walls having inner surfaces adapted to be flush against an outer surface of said wall board; or,
   d) combinations of "a", "b" and "c" together.

The non-stackable rectangular or square electrical box further may optionally include a slidable pull handle tab 19 integrally and slidably attached to an outer surface of a planar side wall of the electrical box, the slidable pull handle tab 19 being slidably movable between an extended position with a portion thereof protruding outwardly from a front of the electrical box, and a retracted position completely flush against an outer surface of the electrical box. The pull handle tab 19 has a finger-graspable aperture 19a in the extended portion of the pull handle tab 19 with aperture 19a for grasping during positioning of the electrical box in place. The pull handle tab 19 with aperture 19a is adapted to allow the pull handle tab 19 with aperture 19a to be pushed into the retracted position after the electrical box is fixed in place in a wall panel board or stud. Optionally, the finger pull handle tab 19 can have a small linear slot 19b near its distal end so that the installer can optionally insert the installer's finger nail or a flat head screwdriver into the distal linear slot 19b for extending the finger pull handle tab 19 outward from the work box 1, to hold the work box 1 by the installer's finger and avoid dropping the work box 1 below and behind the SHEET ROCK® wall panel WP.

Likewise, the electrical workbox can be a non-stackable round electrical box, such as shown in FIGS. 27-29, including one or more of:

1) a partially extending circumferential round wall having a planar wall extending and connecting opposite arc edges of said partially extending circumferential round wall;
2) the partially extending circumferential round wall having a front opening and a rear closed portion;
3) a rear closed portion of the electrical box adapted to extend into an opening in a wall board;
4) at least one fastener singularly or in combination selected from the group consisting of;
   a) one or more internal fasteners with mounts inside said electrical box, said fasteners attachable to a stud within the wall to which the electrical box is fastenable;
   b) one or more external toggle fasteners for mounting the electrical work box within a wall panel;
   c) a plurality of spaced flanges extending outwardly from said upper edges of said side walls having inner surfaces adapted to be flush against an outer surface of said wall board; or,
   d) combinations of "a", "b" and "c" together.

The round electrical box further includes a slidable pull handle tab 19 with aperture 19a integrally and slidably attached to an outer surface of the planar wall of the round electrical box. The slidable pull handle tab 19 with aperture 19a is slidably movable between an extended position with a portion thereof protruding outwardly from a front of the round electrical box, and a retracted position completely flush against an outer surface of the round electrical box. The pull handle tab 19 has a finger-graspable aperture 19a in the extended portion of the pull handle tab 19, with the aperture 19a being provided for grasping during positioning of the round electrical box in place. The pull handle tab 19 with aperture 19a is adapted to allow the pull handle tab 19 with aperture. 19a to be pushed into the retracted position after the round electrical box is fixed in place. Optionally, the finger pull handle tab 19 can have a small linear slot 19b near its distal end so that the installer can optionally insert the installer's fingernail, or a flat head screwdriver, into the distal linear slot 19b for pulling out the extendable finger pull handle tab 19 from the work box 1, to stabilize the work box 1 within the cut-out hole 15 and avoid dropping the work box 1 below and behind the SHEET ROCK® wall panel WP.

In the foregoing description, certain terms and visual depictions are used to illustrate the preferred embodiment. However, no unnecessary limitations are to be construed by the terms used or illustrations depicted, beyond what is shown in the prior art, since the terms and illustrations are exemplary only, and are not meant to limit the scope of the present invention.

For example, the present invention includes an electrical work box including one or more of:

a hollow electrical work box having an open front, a closed rear portion and one of more walls connecting said open front to said closed rear of said electrical work box, defining a closed hollow, open ended interior of said electrical work box. For example, as shown in FIGS. 1-26, the electrical box to which the handle is attached thereto, may have four walls, including a top wall, bottom wall and left and right wall, each joined together by a rear wall to form an open fronted work box. Optionally, as shown in FIGS. 27-29, the open-fronted work box may have one continuous wall, such as a circle or other round geometric shape, joined also by a closed rear wall.

Therefore, the electrical work box has one or more walls, joined by a rear wall and the electrical work box is adapted to extend into a cutout opening in a wall panel board or to be attached to a supporting wall stud.

The electrical work box described herein has at least one fastener singularly or in combination selected from the group consisting of;
   a) one or more internal fasteners with mounts, such as mounts 14b shown in FIG. 1 inside the electrical work box, where the fasteners, such as screws or nails, are attachable to a stud within the wall to which the electrical work box is fastenable;
   b) one or more external toggle fasteners for mounting said electrical work box within a wall panel board, described in the specification herein on page 9, lines 5-12, page 10, lines 10-16, page 11, lines 25-26, page 14, lines 1-4 and page 23, lines 9-19;
   c) a plurality of spaced flanges extending outwardly from said upper edges of respective side walls having inner surfaces adapted to be flush against an outer surface of said wall board, as shown in FIGS. 1, 2, 10, 11 and 12 as reference numeral 28; or,
   d) combinations of "a", "b" and "c" together.

The electrical box further includes a handle; for holding the work box during installation to the cutout hole 15 in the wall panel board or directly to a stud S, such as shown in FIGS. 8 and 9 herein. While the handle can be slidable, such as shown as reference numeral 19 in FIGS. 1, 2, 5, 6, 10, 11, 15, 16, and 27-29, it is known to those skilled in the electrical arts that the handle can extend from the electrical work box and be optionally pivotable from a single pivot point, and be constructed of any geometric configuration, such as a straight rod, a curved rod, or being looped and attachable at one end or both ends thereof, or molded integrally into the work box, or fixed in place and optionally breakable away from the electrical work box, once the electrical work box is installed in place by screws or other fasteners noted above.as long as it is manually graspable by the installer when installing the electrical work box into a cutout hole, such as wall panel cut-out hole 15 shown in FIGS. 10, 11 and 12.

It is further known that other modifications may be made to the present invention, without departing the scope of the invention, as noted in the appended Claims.

I claim:

1. A stackable electrical new work/old work box comprising:
   a front portion compartment having a substantially rectangular cross section formed by planar top wall, two opposite side walls, a bottom wall, with a front cavity opening extending therein;
   a rear end wall of said front portion compartment having extending therefrom a rear protrusion compartment portion comprised of a smaller protrusion compartment top wall, two smaller opposite smaller side wall, a smaller bottom wall,
   a smaller rear wall of said rear protrusion compartment portion of said stackable electrical new work/old work box having a curved radius or mitered corner at one corner side thereof, to permit pivoting sliding insertion of said curved radius corner or mitered corner side into a cutout hole in a wall panel for supporting said stackable, electrical new work/old work box therein;
   whereby insertion of said stackable, electrical new work/old work box can come at any angle to said cutout hole and said curved radius corner or mitered corner edge enables ease of insertion, so that exact perpendicular placement is unnecessary;
   a small front protrusion compartment rectangular opening in said rear end wall of said stackable electrical new work/old work box, from which extends said rear protrusion compartment portion of said stackable electrical new work/old work box;
   said rear protrusion compartment portion having a smaller cross-sectional area than said first portion compartment and terminating in said second bottom wall closing off a bottom of said rear protrusion compartment portion;
   an interior of said rear protrusion compartment portion being a cavity having extending rearward from said cavity opening of said front portion compartment of said stackable electrical new work/old work box;
   said rear end wall of said front portion compartment of said stackable electrical new work/old work box having setbacks separating said top, two sides and bottom edges of said rear end wall of said front portion compartment of said stackable electrical new work/old work box from said respective circumferential edges of said smaller protrusion compartment top wall, two smaller opposite smaller side wall, and said smaller bottom wall of said rear protrusion compartment portion;
   whereby said rear protrusion compartment portion of said stackable new work/old work box is geometrically nestable within a front portion compartment rear portion of another adjacent electrical new work/old work box located behind stackable new work/old work box of like configuration;
   thereby allowing stacking of said stackable new work/old work electric boxes; and all similar stackable electrical new work/old work boxes can stack into each other by virtue of circumferential edge step backs so that convex regions thereof nest into concave receptacle regions.

2. The stackable electrical new work/old work box as in claim 1 further comprising an opposite side of said box having said curved radius or said mitered corner, on said rear protrusion compartment portion having an axially extending distal, flat nail tab set back about ½ inch from said front cavity opening of said front portion compartment of said stackable, electrical new work/old work box to accommodate a ½ inch thickness of a cut-out hole in a SHEET ROCK® wall panel in said setback, whereby said distal, flat nail tab rests flush against the inside wall of the SHEET ROCK® wall panel adjacent to said cut-out hole having said new work/old work box positioned therein, for insertion of nails or screws therethrough.

3. The stackable electrical new work/old work box as in claim 2 wherein nail holes are provided in said distal, flat nail tab for inserting nails or screws into adjacent studs, if available.

4. The stackable electrical new work/old work box as in claim 1 further comprising a removable accessory leveling wedge which provides a flat surface when said stackable electrical new work/old work box is being aligned in place for attachment to a wall stud.

5. The stackable electrical new work/old work box as in claim 1 further comprising a slidable pull handle tab integrally and slidably attached to an outer surface of a planar side wall of said front portion compartment, being slidably movable between an extended position with a portion thereof protruding outwardly from a front of said electrical box and a retracted position completely flush against said outer surface, said pull handle tab having a finger-graspable aperture in said extended portion of said pull handle tab, optionally, said finger pull handle tab having a small linear slot near its distal end so that the installer can optionally insert the installer's finger nail or a flat head screwdriver into the distal linear slot for extending the finger pull handle tab outward from the work box 1, to hold the work box by the installer's finger and avoid dropping the work box 1 below and behind the SHEET ROCK® wall panel WP.

6. The stackable electrical new work/old work box of claim 1 in which fastener screws are located within corner projections each located at opposite corners of said electrical new work/old work box, said projections having rounded cylindrical threadable channels for prepositioned screws so that said corner projections do not interfere with stacking an adjacent, like electrical box.

7. The stackable electrical new work/old work box of claim 1 having pivotal toggles for use when no stud is available for attachment of said electrical box in place within a cutout hole in a SHEET ROCK® wall panel.

8. The stackable electrical box of claim 1 in which interior geometry of said electrical box is arranged so that interior channels and protruding mounts are configured to mesh with exterior mirror image configurations to provide stackability of nesting boxes.

9. The stackable electrical box of claim 1 in which said electrical box has a first cavity which is separated from a second cavity within the electrical box by a slide-in wall between said cavities.

10. The stackable electrical new work/old work box as in claim 1 further comprising a slidable pull handle tab integrally and slidably attached to an outer surface of a planar side wall of said front portion compartment, being slidably movable between an extended position with a portion thereof protruding outwardly from a front of said electrical box and a retracted position completely flush against said outer surface, said pull handle tab having a finger-graspable aperture in said extended portion of said pull handle tab.

11. A stackable round electrical box comprising:
a front portion compartment having a substantially round cross section formed by round side walls with a rear end of said front portion compartment comprised of an annular wall having a round opening from which extends a rear portion compartment of said electrical box having a smaller cross-sectional area than said first portion compartment and terminating in a second bottom wall closing off a bottom of said rear portion compartment;
a removable accessory leveling wedge which provides a flat surface when said stackable round electrical box is being aligned in place for attachment to a wall stud;
an interior of said rear portion compartment being a cavity having a tapered, shallow-angled truncated round shape formed by circular side walls thereof so that said rear portion compartment will nest within a rear portion compartment of another electrical box of like configuration;
in which interior geometry of said electrical box is arranged so that interior channels and protruding mounts are configured to mesh with exterior mirror image configurations to provide stackability of nesting boxes; and
thereby allowing stacking of said stackable round electric boxes.

12. The stackable round electrical box of claim 11 having means to stop insertion of an inserted electrical box at a point limiting insertion depth of the inserted electrical box.

13. The stackable round electrical box of claim 11 having a slidable pull handle tab integrally and slidably attached to an outer surface of a side wall of said front portion compartment, being slidably movable between an extended position with a portion compartment thereof protruding outwardly from a front of said electrical box and a retracted position completely flush against said outer surface, said pull handle tab having a finger-graspable aperture, optionally, said finger pull handle tab having a small linear slot near its distal end so that the installer can optionally insert the installer's finger nail or a flat head screwdriver into the distal linear slot for extending the finger pull handle tab outward from the work box, to hold the work box by the installer's finger and avoid dropping the work box below and behind the SHEET ROCK® wall panel WP.

14. The stackable round electrical box of claim 11 in which fastener screws are located within respective projections each located at opposite locations of said round electrical box, said respective projections having rounded cylindrical threadable channels for prepositioned screws so that said projections do not interfere with stacking an adjacent, like round electrical box.

15. The stackable round electrical box of claim 11 having pivotal toggles for use when no stud is available for attachment of said round electrical box in place.

16. The stackable round electrical box of claim 11 in which interior geometry of said electrical box is arranged so that interior channels and protruding mounts are configured to mesh with exterior mirror image configurations to provide stackability of nesting round electrical boxes.

17. A rectangular or square electrical box comprising:
a plurality of planar walls including a top wall, two side walls, a rear wall and a bottom wall forming an open end surrounded by upper edges of said walls; a bottom portion of said electrical box adapted to extend into an opening in a wall board; at least one fastener singularly or in combination selected from the group consisting of;
a) one or more internal fasteners with mounts inside said electrical box, said fasteners attachable to a stud within the wall to which the electrical box is fastenable;
b) one or more external toggle fasteners for mounting the electrical work box within a wall panel;
c) a plurality of spaced flanges extending outwardly from said upper edges of said side walls having inner surfaces adapted to be flush against an outer surface of said wall board; or,
d) combinations of "a", "b" and "c" together; and,
said rectangular or square electrical box further including a slidable pull handle tab integrally and slidably attached to an outer surface of a planar side wall of said electrical box, said slidable pull handle tab being slidably movable between an extended position with a portion thereof protruding outwardly from a front of said electrical box and a retracted position completely flush against an outer surface of said electrical box, said pull handle tab having a finger-graspable aperture, optionally, said finger pull handle tab 19 having a small linear slot 19b near its distal end so that the installer can optionally insert the installer's finger nail or a flat head screwdriver into the distal linear slot 19b for extending the finger pull handle tab 19 outward from the work box 1, to hold the work box 1 by the installer's finger and avoid dropping the work box 1 below and behind the SHEET ROCK® wall panel WP, said pull handle tab being adapted to allow said pull handle tab to be pushed into said retracted position after said electrical box is fixed in place.

18. A round electrical box comprising one or more of:
a partially extending circumferential round wall having a planar wall extending and connecting opposite arc edges of said partially extending circumferential round wall;
said partially extending circumferential round wall having a front opening and a rear closed portion compartment;
a rear closed portion compartment of said electrical box adapted to extend into an opening in a wall board;
at least one fastener singularly or in combination selected from the group consisting of;
a) one or more internal fasteners with mounts inside said electrical box, said fasteners attachable to a stud within the wall to which the electrical box is fastenable;
b) one or more external toggle fasteners for mounting the electrical work box within a wall panel;
c) a plurality of spaced flanges extending outwardly from said upper edges of said side walls having inner surfaces adapted to be flush against an outer surface of said wall board; or,
d) combinations of "a", "b" and "c" together; and,
said round electrical box further including a slidable pull handle tab integrally and slidably attached to an outer surface of said planar wall of said round electrical box, said slidable pull handle tab being slidably movable between an extended position with a portion thereof protruding outwardly from a front of said electrical box and a retracted position completely flush against an outer surface of said electrical box, said pull handle tab having a finger-graspable aperture, optionally, said finger pull handle tab 19 having a small linear slot 19*b* near its distal end so that the installer can optionally insert the installer's finger nail or a flat head screwdriver into the distal linear slot 19*b* for extending the finger pull handle tab 19 outward from the work box 1, to hold the work box 1 by the installer's finger and avoid dropping the work box 1 below and behind the SHEET ROCK® wall panel WP, said pull handle tab being adapted to allow said pull handle tab to be pushed into said retracted position after said electrical box is fixed in place.

19. An electrical work box comprising one or more of:
a hollow electrical work box having an open front, a closed rear portion and one of more walls connecting said open front to said closed rear of said work box, defining a closed hollow, open ended interior of said electrical work box;
said electrical work box adapted to extend into a cutout opening in a wall panel board or to be attached to a supporting wall stud;
said electrical work box having at least one fastener singularly or in combination selected from the group consisting of;
a) one or more internal fasteners with mounts inside said electrical work box, said fasteners attachable to a stud within the wall to which said electrical work box is fastenable;
b) one or more external toggle fasteners for mounting said electrical work box within a wall panel;
c) a plurality of spaced flanges extending outwardly from said upper edges of respective one or more side walls having inner surfaces adapted to be flush against an outer surface of said wall panel board; or,
d) combinations of "a", "b" and "c" together; and,
said electrical work box further including a handle attachable and/or detachable therefrom; said handle holding said electrical work box during installation to said cutout in said wall panel board or directly to a stud
said handle extendable from said electrical work box and being optionally pivotable from a single pivot point, said handle being constructed of any geometric configuration selected from the group consisting of a straight rod, a curved rod, a loop attachable at one end or both ends thereof,
said handle being provided from the group consisting of being molded integrally into the work box, being fixed in place and/or being optionally breakable away from said electrical work box, once the electrical work box is installed in place by screws or other fasteners noted above,
said handle being manually graspable by the installer when installing the electrical work box into a cutout hole in a wall panel.

20. A rectangular or square electrical box comprising:
a plurality of planar walls including a top wall, two side walls, a rear wall and a bottom wall forming an open end surrounded by upper edges of said walls;
a bottom portion of said electrical box adapted to extend into an opening in a wall board;
at least one fastener singularly or in combination selected from the group consisting of;
e) one or more internal fasteners with mounts inside said electrical box, said fasteners attachable to a stud within the wall to which the electrical box is fastenable;
f) one or more external toggle fasteners for mounting the electrical work box within a wall panel;
g) a plurality of spaced flanges extending outwardly from said upper edges of said side walls having inner surfaces adapted to be flush against an outer surface of said wall board; or,
h) combinations of "a", "b" and "c" together; and,
said rectangular or square electrical box further including a slidable pull handle tab integrally and slidably attached to an outer surface of a planar side wall of said electrical box, said slidable pull handle tab being slidably movable between an extended position with a portion thereof protruding outwardly from a front of said electrical box and a retracted position completely flush against an outer surface of said electrical box, to hold the work box 1 by the installer's finger and avoid dropping the work box 1 below and behind the SHEET ROCK® wall panel WP, said pull handle tab being adapted to allow said pull handle tab to be pushed into said retracted position after said electrical box is fixed in place.

21. A round electrical box comprising one or more of:
a partially extending circumferential round wall having a planar wall extending and connecting opposite arc edges of said partially extending circumferential round wall;
said partially extending circumferential round wall having a front opening and a rear closed portion compartment;
a rear closed portion compartment of said electrical box adapted to extend into an opening in a wall board;
at least one fastener singularly or in combination selected from the group consisting of;

e) one or more internal fasteners with mounts inside said electrical box, said fasteners attachable to a stud within the wall to which the electrical box is fastenable;
f) one or more external toggle fasteners for mounting the electrical work box within a wall panel;
g) a plurality of spaced flanges extending outwardly from said upper edges of said side walls having inner surfaces adapted to be flush against an outer surface of said wall board; or,
h) combinations of "a", "b" and "c" together; and,
said round electrical box further including a slidable pull handle tab integrally and slidably attached to an outer surface of said planar wall of said round electrical box, said slidable pull handle tab being slidably movable between an extended position with a portion thereof protruding outwardly from a front of said electrical box and a retracted position completely flush against an outer surface of said electrical box, to hold the work box 1 by the installer's finger and avoid dropping the work box 1 below and behind the SHEET ROCK® wall panel WP, said pull handle tab being adapted to allow said pull handle tab to be pushed into said retracted position after said electrical box is fixed in place.

* * * * *